(12) United States Patent
Shimura et al.

(10) Patent No.: US 11,146,753 B2
(45) Date of Patent: Oct. 12, 2021

(54) IMAGING APPARATUS, SIGNAL PROCESSING METHOD FOR IMAGING APPARATUS, AND ELECTRONIC EQUIPMENT

(71) Applicant: SONY SEMICONDUCTOR SOLUTIONS CORPORATION, Kanagawa (JP)

(72) Inventors: Masahiro Shimura, Tokyo (JP); Seijiro Sakane, Tokyo (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 16/976,740

(22) PCT Filed: Feb. 5, 2019

(86) PCT No.: PCT/JP2019/003981
§ 371 (c)(1),
(2) Date: Aug. 28, 2020

(87) PCT Pub. No.: WO2019/171853
PCT Pub. Date: Sep. 12, 2019

(65) Prior Publication Data
US 2021/0006740 A1 Jan. 7, 2021

(30) Foreign Application Priority Data
Mar. 6, 2018 (JP) .............................. JP2018-039339

(51) Int. Cl.
*H04N 5/378* (2011.01)
*H04N 5/357* (2011.01)
*H04N 5/369* (2011.01)
*H04N 5/365* (2011.01)

(52) U.S. Cl.
CPC ............. *H04N 5/378* (2013.01); *H04N 5/357* (2013.01); *H04N 5/3651* (2013.01); *H04N 5/379* (2018.08)

(58) Field of Classification Search
CPC ...... H04N 5/357; H04N 5/3651; H04N 5/374; H04N 5/378; H04N 5/379; H03M 1/10–1/1057
See application file for complete search history.

(56) References Cited

U.S. PATENT DOCUMENTS

| 7,233,277 B2 * | 6/2007 | Roh .................... H03M 1/1071 341/155 |
| 8,941,527 B2 * | 1/2015 | Yang ..................... H04N 5/357 341/167 |

(Continued)

FOREIGN PATENT DOCUMENTS

| CN | 103369268 A | 10/2013 |
| JP | 2008-252605 A | 10/2008 |

(Continued)

OTHER PUBLICATIONS

International Search Report and Written Opinion of PCT Application No. PCT/JP2019/003981, dated Apr. 23, 2019, 06 pages of ISRWO.

*Primary Examiner* — Lin Ye
*Assistant Examiner* — Chriss S Yoder, III
(74) *Attorney, Agent, or Firm* — Chip Law Group

(57) ABSTRACT

An imaging apparatus includes: a plurality of analog-digital conversion units that performs parallel processing on a signal of each pixel output in units of a plurality of pixel rows from a pixel array unit in which pixels including photoelectric conversion units are arranged, and converts the signal into a digital signal; a plurality of reference voltage generation units that is provided corresponding to the plurality of analog-digital conversion units and generates a (Continued)

reference voltage used for AD conversion; a voltage setting unit that sets a plurality of pixel voltage levels and outputs the plurality of pixel voltage levels through each of the plurality of analog-digital conversion units; and a computing unit that calculates a correction amount for performing correction on a result of the AD conversion of the signal of each pixel of the pixel array unit. The computing unit calculates the correction amount on the basis of the result of the AD conversion of each of the plurality of pixel voltage levels by each of the plurality of analog-digital conversion units.

16 Claims, 17 Drawing Sheets

(56) References Cited

U.S. PATENT DOCUMENTS

| | | |
|---|---|---|
| 2008/0239124 A1 | 10/2008 | Mori et al. |
| 2013/0256512 A1 | 10/2013 | Shioya |
| 2016/0205333 A1* | 7/2016 | Shishido .............. H04N 5/3658 |
| | | 348/308 |

FOREIGN PATENT DOCUMENTS

| | | |
|---|---|---|
| JP | 2013-207433 A | 10/2013 |
| WO | 2015/079597 A1 | 6/2015 |

* cited by examiner

IMAGING APPARATUS, SIGNAL PROCESSING METHOD FOR IMAGING APPARATUS, AND ELECTRONIC EQUIPMENT

CROSS REFERENCE TO RELATED APPLICATIONS

This application is a U.S. National Phase of International Patent Application No. PCT/JP2019/003981 filed on Feb. 5, 2019, which claims priority benefit of Japanese Patent Application No. JP2018-039339 filed in the Japan Patent Office on Mar. 6, 2018. Each of the above-referenced applications is hereby incorporated herein by reference in its entirety.

TECHNICAL FIELD

The present disclosure relates to an imaging apparatus, a signal processing method for the imaging apparatus, and electronic equipment.

BACKGROUND ART

In an imaging element such as a CMOS image sensor, a so-called column-parallel analog-digital conversion type in which analog-digital conversion (hereinafter sometimes referred to as "AD conversion") is performed in parallel in the column direction with respect to a pixel array unit (pixel group) in which pixels are arranged in a matrix is known. In this type of imaging element, the number of pixels of the imaging element has been increasing in recent years, and the number of imaging frame outputs (frame rate) per unit time has also increasing.

In the column-parallel analog-digital conversion type imaging element, the frame rate can be improved by increasing the number of times of AD conversion processing per unit time and improving the processing speed from AD conversion to imaging frame output. As one of the techniques for improving the frame rate, there is a technique of performing column-parallel AD conversion in parallel for a plurality of pixel rows. In this conventional technique, a configuration is adopted in which, for example, two systems of column-parallel AD conversion units are arranged above and below across a pixel array unit (see, for example, Patent Document 1).

CITATION LIST

Patent Document

Patent Document 1: Japanese Patent Application Laid-Open No. 2008-252605 (particularly, paragraph [0144] and FIG. 17)

SUMMARY OF THE INVENTION

Problems to be Solved by the Invention

In the conventional technique described in Patent Document 1, a so-called reference voltage generation unit that generates a reference voltage of a ramp wave (RAMP wave) is provided for each of the two systems of column-parallel AD conversion units. However, by having a plurality of reference voltage generation units, even if the setting of the reference voltage of the ramp wave is the same, there is a slight difference between the plurality of reference voltages of the ramp waves due to individual variations among the reference voltage generation units. This slight difference among the reference voltages appears as a poor image quality due to the horizontal stripes with respect to the imaging frame or as a step between AD conversion regions, which is one of the causes of deterioration in image quality of a captured image.

It is an object of the present disclosure to provide an imaging apparatus that can suppress a poor image quality due to an error between reference voltages due to individual variations between a plurality of reference voltage generation units and improve the image quality of a captured image, a signal processing method thereof, and electronic equipment including the imaging apparatus.

Solutions to Problems

An imaging apparatus of the present disclosure for achieving the aforementioned object includes:

a plurality of analog-digital conversion units that performs parallel processing on a signal of each pixel output in units of a plurality of pixel rows from a pixel array unit in which pixels including photoelectric conversion units are arranged, and converts the signal into a digital signal;

a plurality of reference voltage generation units that is provided corresponding to the plurality of analog-digital conversion units and generates a reference voltage used for analog-digital conversion;

a voltage setting unit that sets a plurality of pixel voltage levels and outputs the plurality of pixel voltage levels through each of the plurality of analog-digital conversion units; and a computing unit that calculates a correction amount for performing correction on a result of the analog-digital conversion of the signal of each pixel of the pixel array unit, in which the computing unit calculates the correction amount on the basis of the result of the analog-digital conversion of each of the plurality of pixel voltage levels by each of the plurality of analog-digital conversion units.

Furthermore, a signal processing method for an imaging apparatus of the present disclosure for achieving the aforementioned object, in performing signal processing of the imaging apparatus including:

a plurality of analog-digital conversion units that performs parallel processing on a signal of each pixel output in units of a plurality of pixel rows from a pixel array unit in which pixels including photoelectric conversion units are arranged, and converts the signal into a digital signal; and a plurality of reference voltage generation units that is provided corresponding to the plurality of analog-digital conversion units and generates a reference voltage used for analog-digital conversion, the method including:

setting a plurality of pixel voltage levels and outputting the plurality of pixel voltage levels through each of the plurality of analog-digital conversion units; and calculating a correction amount for performing correction on a result of the analog-digital conversion of the signal of each pixel of the pixel array unit on the basis of the result of the analog-digital conversion of each of the plurality of pixel voltage levels by each of the plurality of analog-digital conversion units.

Furthermore, electronic equipment of the present disclosure for achieving the aforementioned object includes the imaging apparatus having the configuration described above.

MODE FOR CARRYING OUT THE INVENTION

Figure 1:
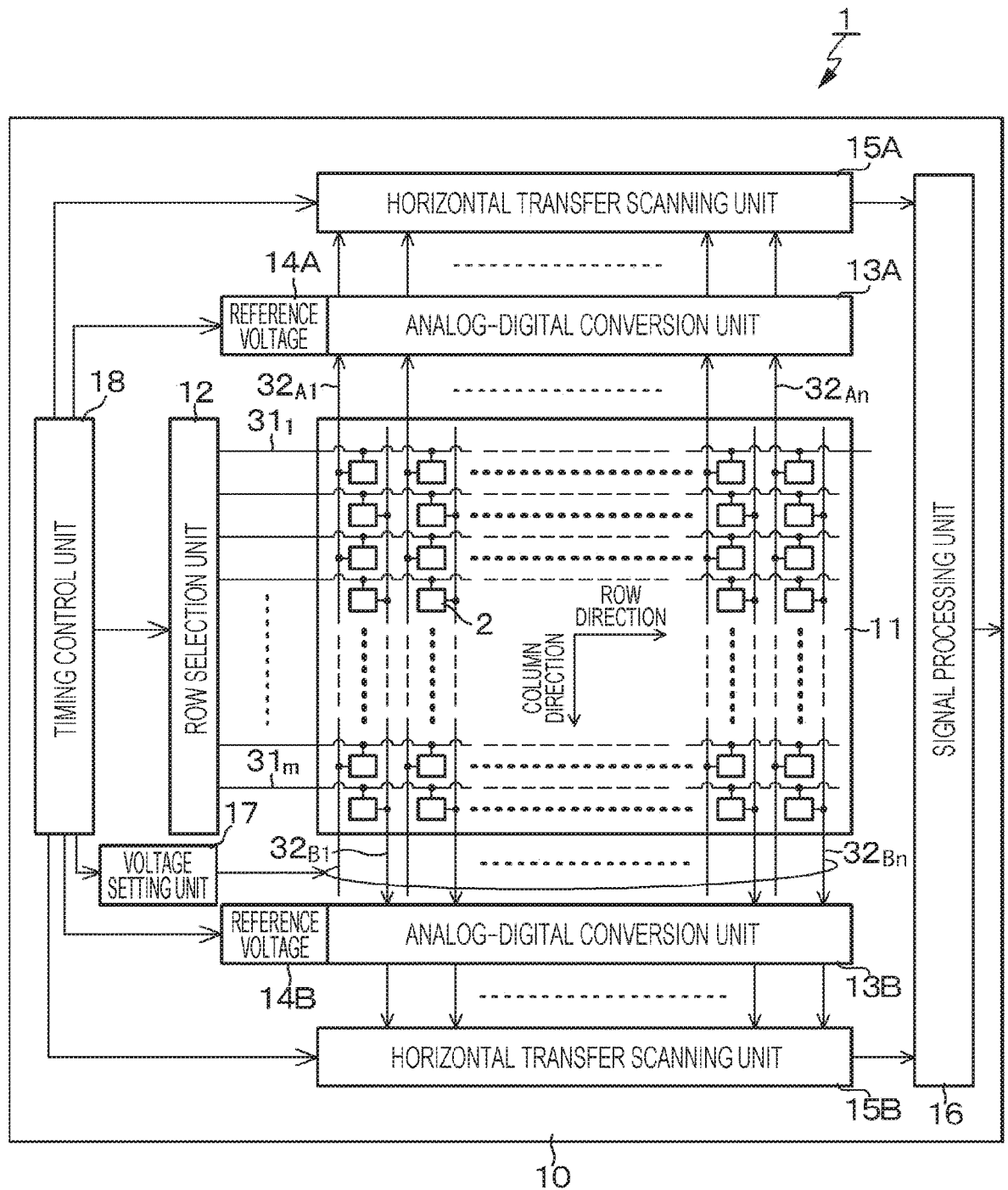
FIG. 1 is a schematic configuration diagram illustrating an outline of a basic configuration of a CMOS image sensor according to an embodiment of the present disclosure.

Aspects for carrying out the technology of the present disclosure (hereinafter, the "embodiments") are described below in conjunction with the drawings. The technology of the present disclosure is not limited to the embodiments. In the following description, the same symbol is used for the same elements or elements having the same function, and a redundant description is omitted. Note that the description is provided in the order set forth below.

1. Description of imaging element and signal processing method thereof of the present disclosure, and electronic equipment, and general 2. Imaging element according to an embodiment of the present disclosure
   2-1. Example of CMOS image sensor
   2-2. Configuration example of unit pixel
   2-3. Chip structure
   2-4. Regarding poor image quality due to two reference voltage generation units
   2-5. System configuration of the imaging apparatus of the present disclosure
   2-6. Description of the embodiments
      2-6-1. Example 1
      2-6-2. Example 2
      2-6-3. Example 3
      2-6-4. Example 4
      2-6-5. Variation of the embodiment
      2-6-6. Application example of the embodiment
3. Electronic equipment of the present disclosure
   3-1. Camera module
   3-2. Application examples to mobile objects
4. Configuration that can be adopted by the present disclosure <Description of Imaging Apparatus and Signal Processing Method Thereof of the Present Disclosure, and Electronic Equipment, and General>

In the imaging apparatus, the signal processing method thereof, and the electronic equipment of the present disclosure, a computing unit can be configured to calculate a correction amount for correcting an error of the analog-digital conversion performance between reference voltages in a case where the setting of the reference voltages generated by a plurality of reference voltage generation units is the same. Moreover, the computing unit can be configured to calculate a correction amount on the basis of a characteristic difference of analog-digital conversion values with respect to a pixel voltage level between the plurality of reference voltages.

In the imaging apparatus and the signal processing method thereof of the present disclosure including the above-described preferable configuration, and the electronic equipment, a plurality of pixel voltage levels can include a first pixel voltage level set to a black level and a second pixel voltage level set to a white level. Moreover, regarding the characteristic of an analog-digital conversion value with respect to the pixel voltage level, the computing unit can be configured to calculate a correction amount from a difference in the characteristics based on the analog-digital conversion value in the imaging frame at the time of setting the first pixel voltage level and in the characteristics based on the analog-digital conversion value in the imaging frame at the time of setting the second pixel voltage level.

Moreover, in the imaging apparatus and the signal processing method thereof of the present disclosure including the above-described preferable configuration, and the electronic equipment, the computing unit can be configured to calculate a correction amount from a difference in a slope and intercept of the characteristics of the analog-digital conversion value with respect to the pixel voltage level. The computing unit can be configured such that the analog-digital conversion value of one imaging frame is integrated for each of the first pixel voltage level and the second pixel voltage level, an average value of the analog-digital conversion values is acquired, and, on the basis of the acquired average value, an error amount in the slope and intercept of the characteristics of the analog-digital conversion value with respect to the pixel voltage level is calculated.

Alternatively, in the imaging apparatus and the signal processing method thereof of the present disclosure including the above-described preferable configuration, and the electronic equipment, a voltage setting unit can include dummy pixels formed in a pixel array unit, and the dummy pixels are provided for at least one pixel column corresponding to each of the plurality of reference voltage generation units. Furthermore, in a stacked structure in which at least two semiconductor substrates: a first semiconductor substrate and a second semiconductor substrate are stacked, when the pixel array unit is formed on the first semiconductor substrate, dummy pixels are preferably formed on a semiconductor substrate other than the first semiconductor substrate.

Alternatively, in the imaging apparatus and the signal processing method thereof of the present disclosure including the above-described preferable configuration, and the electronic equipment, the computing unit can be configured to use the calculated correction amount to correct the result of analog-digital conversion on a signal of each pixel of the pixel array unit. At this time, the computing unit can include an image processing unit provided outside the substrate of the pixel array unit, and be configured to perform correction on the result of the analog-digital conversion of an effective pixel of the pixel array unit using the calculated correction amount in the image processing unit.

Alternatively, in the imaging apparatus and the signal processing method thereof of the present disclosure including the above-described preferable configuration, and the electronic equipment, the computing unit includes an external computing apparatus provided outside the substrate of the pixel array unit and supplies the correction amount calculated by the external computing apparatus to the signal processing unit provided in the substrate of the pixel array unit. Then, the signal processing unit can be configured to use the correction amount supplied from the external computing apparatus and correct the result of the analog-digital conversion of an effective pixel of the pixel array unit.

Alternatively, in the imaging apparatus and the signal processing method thereof of the present disclosure including the above-described preferable configuration, and the electronic equipment, the computing unit can include the signal processing unit provided in the substrate of the pixel array unit, and the signal processing unit can be configured to correct the result of the analog-digital conversion of the effective pixel of the pixel array unit using the calculated correction amount.

Imaging Element According to an Embodiment of the Present Disclosure

First, the basic configuration of the imaging element according to an embodiment of the present disclosure will be described. Here, a complementary metal oxide semiconductor (CMOS) image sensor, which is a type of an X-Y address type imaging element will be described as an example of the imaging element according to the present embodiment. The CMOS image sensor is an imaging element manufactured by applying a CMOS process or partially using it.

Example of the CMOS Image Sensor

FIG. 1 is a schematic configuration diagram illustrating an outline of a basic configuration of a CMOS image sensor according to an embodiment of the present disclosure. The CMOS image sensor 1 according to the present embodiment has a pixel array unit 11 in which pixels 2 including photoelectric conversion units are two-dimensionally arranged in a row direction and a column direction, i.e., in a matrix form, on a semiconductor substrate 10. Here, the row direction indicates an arrangement direction of pixels 2 of a pixel row (i.e., a horizontal direction), and the column direction indicates an arrangement direction of pixels 2 of a pixel column (i.e., a vertical direction).

The pixel 2 performs photoelectric conversion in the photoelectric conversion unit to generate and accumulate photocharges depending on the amount of received light. Regarding the structure of the pixel 2, in the semiconductor substrate 10, when the substrate surface on the side where a wiring layer is formed is the surface (front surface), a back-illuminated pixel structure that takes in light emitted from the back surface side on the opposite side can be adopted or a surface-illuminated pixel structure that takes in light emitted from the surface (front surface) can be adopted.

Although not illustrated in FIG. 1, the pixel array unit 11 is generally provided with an optical black (OPB) region. A pixel in the optical black region is a light-shielded pixel for obtaining a reference level for black level, and is usually provided outside pixels used for imaging output (hereinafter sometimes referred to as "effective pixels").

In the pixel array unit 11, pixel drive lines $31_1$ to $31_m$ (hereinafter, sometimes collectively referred to as "pixel drive line 31") are wired along the row direction for each pixel row in a matrix pixel arrangement. Furthermore, vertical signal lines $32_{A1}$ to $32_{An}$ and vertical signal lines $32_{B1}$ to $32_{Bn}$ (hereinafter sometimes collectively referred to as "vertical signal line 32") are wired along the column direction for each pixel column. The pixel drive line 31 transmits a drive signal for performing driving in reading out a signal from the pixel 2. FIG. 1 illustrates one wiring as the pixel drive line 31, but the number is not limited to one. One end of the pixel drive line 31 is connected to an output end corresponding to each row of a row selection unit 12.

Of the two vertical signal lines wired for each pixel column, the vertical signal lines $32_{A1}$ to $32_{An}$ are used, for example, to read pixel signals of odd-numbered pixel rows, and the vertical signal lines $32_{B1}$ to $32_{Bn}$ are used, for example, to read pixel signals of even-numbered pixel rows. That is, by adopting a configuration in which two vertical signal lines 32 are wired for each pixel column, it is possible to read pixel signals in units of two rows.

In the peripheral region of the pixel array unit 11, as a peripheral circuit unit for driving the pixels 2, for example, the row selection unit 12, analog-digital conversion units 13A and 13B, reference voltage generation units 14A and 14B, horizontal transfer scanning units 15A and 15B, a signal processing unit 16, a voltage setting unit 17, a timing control unit 18, and the like are provided. That is, in the CMOS image sensor 1 according to the present embodiment, the analog-digital conversion unit and the horizontal transfer scanning unit are configured to have two systems above and below the pixel array unit 11, thereby increasing the processing speed from AD conversion to the output of the imaging frame to improve the frame rate.

The peripheral circuit unit of the pixel array unit 11, that is, the row selection unit 12, the analog-digital conversion units 13A and 13B, the reference voltage generation units 14A and 14B, the horizontal transfer scanning units 15A and 15B, the signal processing unit 16, the voltage setting unit 17, and the timing control unit 18 will be described below.

The row selection unit 12 includes a shift register, an address decoder, and the like, and controls the scanning of the pixel row and the address of the pixel row when selecting each pixel 2 of the pixel array unit 11. An illustration of a specific configuration of the row selection unit 12 is omitted.

However, in general, the row selection unit 12 includes two scanning systems: a read scanning system and a sweep scanning system.

The read scanning system selectively scans the pixels 2 of the pixel array unit 11 in order in units of rows so as to read a pixel signal from the pixel array unit 11. The pixel signal read from the pixel 2 is an analog signal. The sweep scanning system performs sweep scanning on a read column to which read scanning is performed by the read scanning system earlier than the read canning by time of shutter speed. By the sweep scanning by the sweep scanning system, an unnecessary charge is swept from the photoelectric conversion unit of the pixel 2 in the read row and the photoelectric conversion unit is reset. Then, when the unnecessary charge is swept (reset) by the sweep scanning system, what is known as an electronic shutter operation is performed. Here, the electronic shutter operation refers to an operation in which photocharges of the photoelectric conversion unit is discarded and exposure is newly started (start of accumulation of photocharges).

The analog-digital conversion units 13A and 13B are a column-parallel type analog-digital conversion unit that includes a set of a plurality of AD converters provided corresponding to each of the vertical signal lines $32_1$ to $32_n$, and performs AD conversion on analog pixel signals of two rows in parallel output for each pixel column through the vertical signal line 32. More specifically, the analog-digital conversion unit 13A performs AD conversion, for example, on each pixel signal in an odd row, and the analog-digital conversion unit 13B performs AD conversion, for example, on each pixel signal in an even row.

As the analog-digital converter of the column-parallel analog-digital conversion units 13A and 13B, a single slope-type analog-digital converter which is an example of a reference signal comparison-type analog-digital converter is used. Details of the specific configuration of the column-parallel analog-digital conversion units 13A and 13B will be described later.

The single slope-type analog-digital converter uses a ramp wave (RAMP wave) reference voltage RAMP whose voltage value gradually changes as time passes. Therefore, the reference voltage generation units 14A and 14B that generate the ramp wave reference voltage RAMP are arranged near the two systems of the analog-digital conversion units 13A and 13B. The reference voltage generation units 14A and 14B can be configured by, for example, a digital-analog conversion (DA conversion) circuit.

In order to perform AD conversion under the same conditions in the two systems of the analog-digital conversion units 13A and 13B, the ramp wave reference voltage RAMP has the same setting between the reference voltage generation units 14A and 14B. Here, the "same setting" means not only the strictly same setting, but also the substantially same setting, and the presence of various variations caused in design or manufacturing is allowed.

By the way, in order to use the reference voltage RAMP of the same waveform in the two systems of the analog-digital conversion units 13A and 13B, generally, one reference voltage generation unit is shared between the two systems of the analog-digital conversion units 13A and 13B. However, for example, since the circuit scale of the reference voltage generation unit including a DA conversion circuit and the like is large, it is difficult to ensure a space for disposing the reference voltage generation unit at the equivalent distance from the two systems of the analog-digital conversion units 13A and 13B in the peripheral region of the pixel array unit 11. For such a reason, the reference voltage generation units 14A and 14B are arranged in the vicinity of each of the two systems of the analog-digital conversion units 13A and 13B.

The horizontal transfer scanning units 15A and 15B include a shift register, an address decoder, and the like, and control the scanning of the pixel column and the address of the pixel column when reading the signal of each pixel 2 of the pixel array unit 11. Then, under the control of the horizontal transfer scanning units 15A and 15B, the pixel signals converted into digital signals by the analog-digital conversion units 13A and 13B are read out and output to the signal processing unit 16. Specifically, the horizontal transfer scanning unit 15A outputs pixel signals of odd-numbered rows of the pixel array unit 11 to the signal processing unit 16, and the horizontal transfer scanning unit 15B outputs pixel signals of even-numbered rows of the pixel array unit 11 to the signal processing unit 16.

The signal processing unit 16 performs signal processing that rearranges the pixel signals of the odd rows supplied from the horizontal transfer scanning unit 15A and the pixel signals of the even rows supplied from the horizontal transfer scanning unit 15B in the order of the pixel rows of the pixel array unit 11. Moreover, the signal processing unit 16 performs, for example, various kinds of signal processing such as amplification processing and computation processing on the pixel signals rearranged in the order of the pixel rows of the pixel array unit 11.

The voltage setting unit 17 is one of the characteristic parts of the present embodiment, and sets a plurality of pixel voltage levels, for example, the first pixel voltage level and the second pixel voltage level, and outputs the pixel voltage levels through the two systems of the analog-digital conversion units 13A and 13B. Details of the operation of the voltage setting unit 17 will be described later.

The timing control unit 18 generates various timing signals, clock signals, control signals, and the like, and on the basis of these generated signals, controls the driving of the row selection unit 12, the analog-digital conversion units 13A and 13B, the horizontal transfer scanning unit 15A and 15B, the signal processing unit 16, the voltage setting unit 17, and the like.

As described above, the CMOS image sensor 1 according to the present embodiment is configured such that the analog-digital conversion unit, the horizontal transfer scanning unit, and the like are arranged on one side (the upper side of the drawing) and the other side (the lower side of the drawing) across the pixel array unit 11 in the column direction so as to read the pixel signals up and down in units of two pixel rows. With the up-and-down reading configuration, the processing speed from the AD conversion to the output of the imaging frame can be improved, so that the frame rate can be improved.

Note that, in the present embodiment, the configuration having the two systems of the analog-digital conversion units, the horizontal transfer scanning units, and the like for reading the pixel signals is illustrated, but the number of systems is not limited to two, and the number of systems is not limited to even numbers. That is, the configuration having a plurality of systems equal to or more than three systems of the analog-digital conversion units, the horizontal transfer scanning units, and the like may be adopted.

Example of Pixel Circuit Configuration

Figure 2:
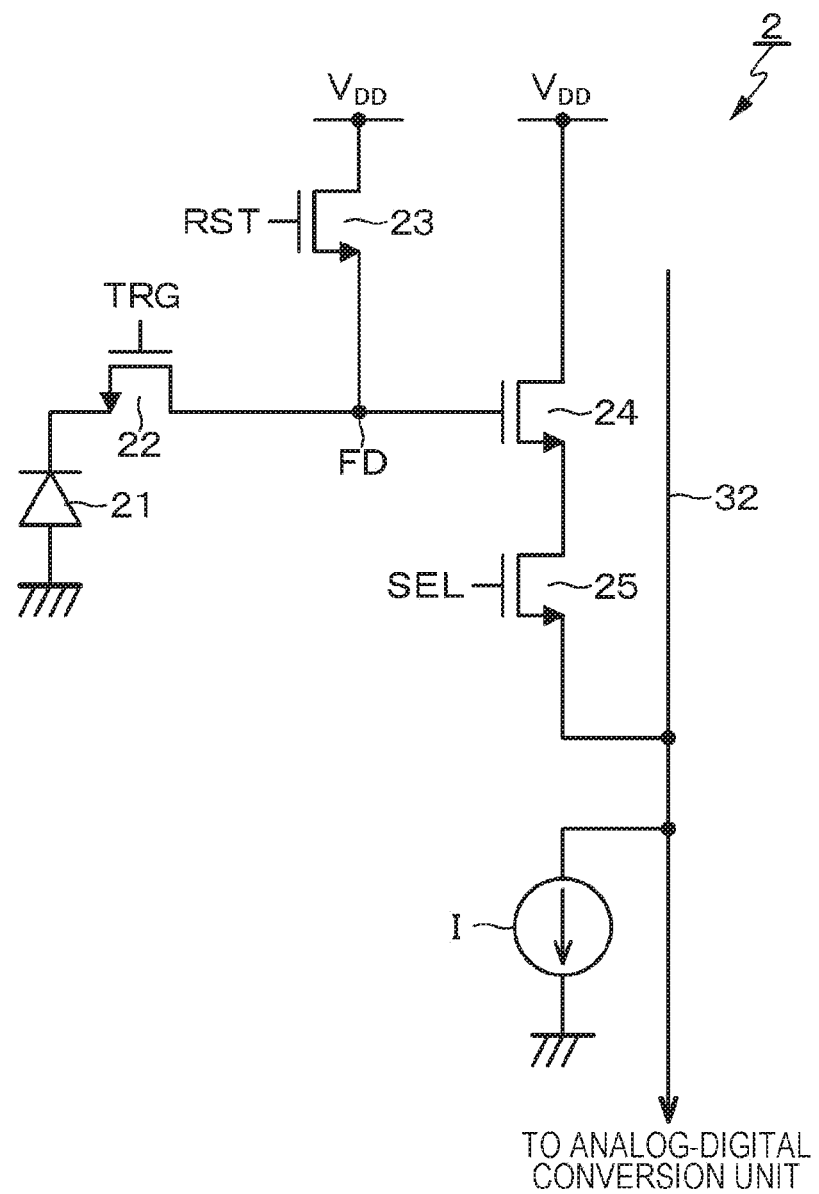
FIG. 2 is a circuit diagram illustrating an example of a circuit configuration of a pixel.

FIG. 2 is a circuit diagram illustrating an example of a circuit configuration of the pixel 2. The pixel 2 has, for example, a photodiode 21 as a photoelectric conversion unit.

The pixel 2 has a pixel configuration including a transfer transistor 22, a reset transistor 23, an amplification transistor 24, and a selection transistor 25 in addition to the photodiode 21.

Note that, here, as the four transistors: the transfer transistor 22, the reset transistor 23, the amplification transistor 24, and the selection transistor 25, for example, N-channel MOS type field effect transistors (FETs) are used. However, the combinations of the conductivity types (channels) of the four transistors 22 to 25 illustrated here are mere examples, and the combinations are not limited to these combinations.

For the pixel 2, a plurality of pixel drive lines is wired in common to each pixel 2 in the same pixel row as the pixel drive line 31 described above. The plurality of pixel drive lines is connected to output terminals of the row selection unit 12 corresponding to each pixel row in units of pixel rows. The row selection unit 12 appropriately outputs a transfer signal TRG, a reset signal RST, and a selection signal SEL to the plurality of pixel drive lines.

The photodiode 21 has an anode electrode connected to a low potential-side power supply (for example, ground), and photoelectrically converts the received light into photocharges (here, photoelectrons) of a charge amount corresponding to the amount of light, and accumulates the photocharges A cathode electrode of the photodiode 21 is electrically connected to the gate electrode of the amplification transistor 24 via the transfer transistor 22. Here, a region where the gate electrode of the amplification transistor 24 is electrically connected is a floating diffusion (floating diffusion region/impurity diffusion region) FD. The floating diffusion FD is a charge-voltage conversion unit that converts charges into a voltage.

To the gate electrode of the transfer transistor 22, the transfer signal TRG for which a high level (for example, $V_{DD}$ level) becomes active is given from the row selection unit 12. The transfer transistor 22 becomes a conductive state in response to the transfer signal TRG, and transfers the photocharge, which is photoelectrically converted by the photodiode 21 and accumulated in the photodiode 21, to the floating diffusion FD.

The reset transistor 23 is connected between a node of a high potential-side power supply $V_{DD}$ and the floating diffusion FD. To the gate electrode of the reset transistor 23, the reset signal RST for which a high level becomes active is given from the row selection unit 12. The reset transistor 23 becomes a conductive state in response to the reset signal RST, and resets the floating diffusion FD by discarding the charge of the floating diffusion FD to the node of the voltage $V_{DD}$.

The amplification transistor 24 has a gate electrode connected to the floating diffusion FD and a drain electrode connected to the node of the high potential-side power supply $V_{DD}$. The amplification transistor 24 is an input unit of a source follower that reads out a signal obtained by photoelectric conversion in the photodiode 21. That is, the source electrode of the amplification transistor 24 is connected to the vertical signal line 32 via the selection transistor 25. Then, the amplification transistor 24 and a current source I connected to one end of the vertical signal line 32 constitute a source follower that converts the voltage of the floating diffusion FD to the potential of the vertical signal line 32.

The drain electrode of the selection transistor 25 is connected to the source electrode of the amplification transistor 24, and the source electrode is connected to the vertical signal line 32. To the gate electrode of the selection transistor 25 the selection signal SEL for which a high level becomes active is given from the row selection unit 12. The selection transistor 25 becomes a conductive state in response to the selection signal SEL to set the pixel 2 to a selected state, and transmits the signal output from the amplification transistor 24 to the vertical signal line 32.

Note that the selection transistor 25 may adopt a circuit configuration connected between the node of the high potential-side power supply voltage $V_{DD}$ and the drain electrode of the amplification transistor 24. Furthermore, in this example, as the pixel circuit of the pixel 2, the 4Tr configuration including the transfer transistor 22, the reset transistor 23, the amplification transistor 24, and the selection transistor 25, that is, the four transistors (Tr), has been described as an example, but is not limited thereto. For example, a 3Tr configuration in which the selection transistor 25 is omitted and the amplification transistor 24 has the function of the selection transistor 25 may be adopted, and if necessary, the number of transistors may be increased to 5Trs or more.

Example of Configuration of the Analog-Digital Conversion Unit

Figure 3:
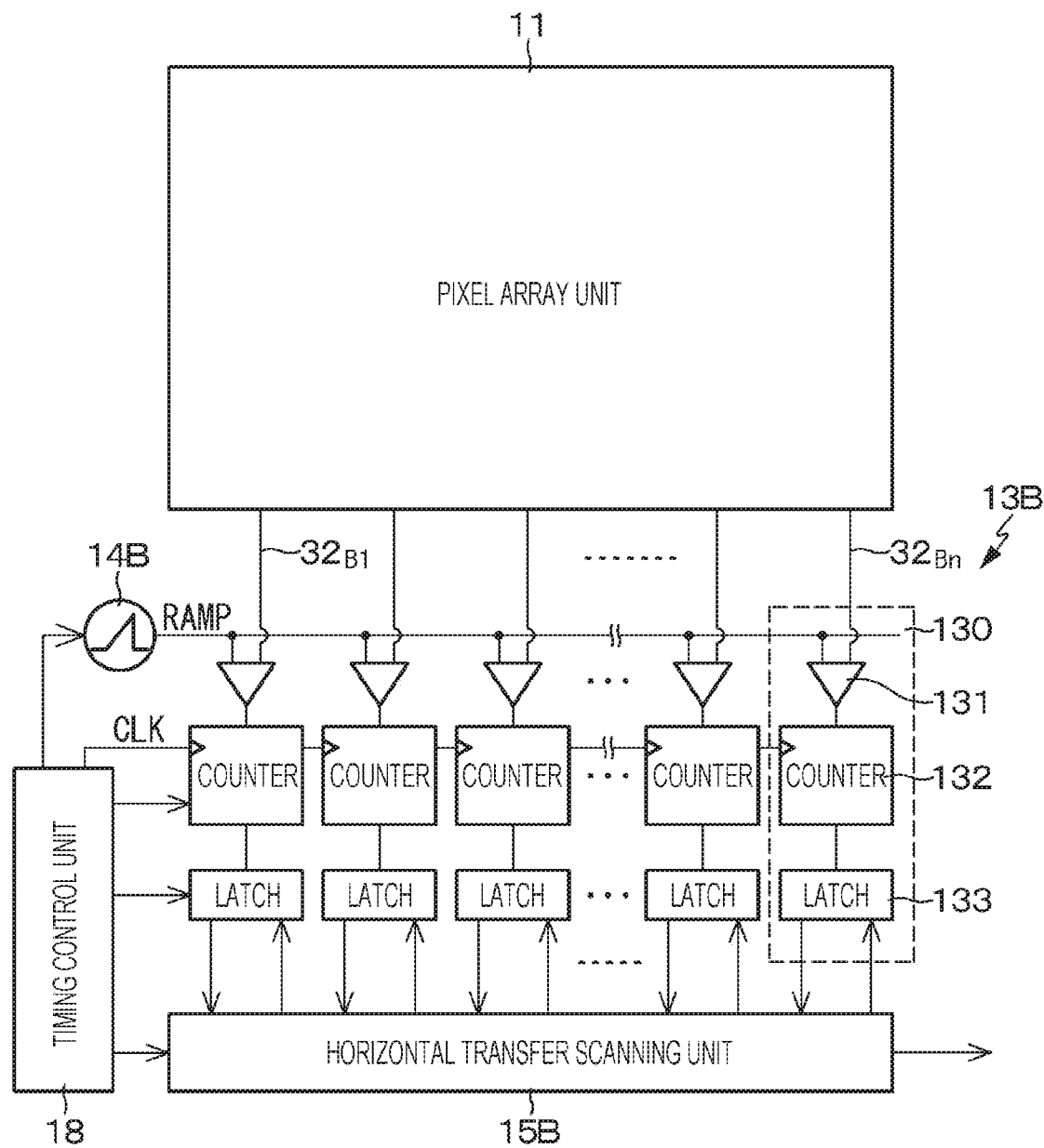
FIG. 3 is a block diagram illustrating an example of a configuration of a column-parallel type analog-digital conversion unit.

Next, a specific configuration of the column-parallel type analog-digital conversion units 13A and 13B will be described. FIG. 3 is a block diagram illustrating an example of a configuration of the analog-digital conversion units 13A and 13B. Here, the configuration of one analog-digital conversion unit 13B is illustrated, but the configuration of the other analog-digital conversion unit 13A is also the same.

The analog-digital conversion unit 13B includes a set of a plurality of single slope-type analog-digital converters provided corresponding to each of the vertical signal lines $32_{B1}$ to $32_{Bn}$. Here, an n-th column single slope-type analog-digital converter 130 will be described as an example.

The single slope-type analog-digital converter 130 has a circuit configuration including a comparator 131, a counter circuit 132, and a latch circuit 133. The single slope-type analog-digital converter 130 is supplied with the ramp wave reference voltage RAMP from the reference voltage generation unit 14B.

The comparator 131 uses the analog pixel signal read from the pixel 2 and output through the vertical signal line 32 as a comparison input, and the reference voltage RAMP generated by the reference voltage generation unit 14B as a reference input, and compares both signals. Then, in the comparator 131, an output becomes a first state (for example, a high level) when the reference voltage RAMP is larger than the pixel signal, and an output becomes a second state (for example, a low level) when the reference voltage RAMP is equal to or less than the pixel signal. Then, the comparator 131 outputs, as a comparison result, a pulse signal having a pulse width corresponding to the signal level of the pixel signal, specifically, the magnitude of the signal level.

A clock signal CLK is given from the timing control unit 18 to the counter circuit 132 at the same timing as the timing of starting the supply of the reference voltage RAMP to the comparator 131. Then, the counter circuit 132 measures the pulse width period of the output pulse of the comparator 131, that is, the period from the start of the comparison operation to the end of the comparison operation by performing a counting operation in synchronization with the clock signal CLK. The counting result (count value) of the counter circuit 132 becomes a digital value obtained by digitizing an analog pixel signal.

The latch circuit 133 holds (latches) the digital value, which is a counting result of the counter circuit 132. Furthermore, the latch circuit 133 performs correlated double sampling (CDS), which is an example of noise removal processing by calculating a difference between a D-phase count value corresponding to the pixel signal of the signal level and a P-phase count value corresponding to the pixel signal of the reset level. Then, the latched digital value is output under the control of the horizontal transfer scanning unit 15B.

As described above, in the column-parallel analog-digital conversion unit 13B including the set of the single slope-type analog-digital converters 130, a digital value is obtained from time information until the magnitude relationship between the reference voltage RAMP of a linearly changing analog value generated by the reference voltage generation unit 14B and the analog pixel signal output from the pixel 2 changes. Note that, in the above example, the analog-digital conversion unit 13B in which the analog-digital converter 130 is arranged in a one-to-one relationship with the pixel column is illustrated, but the analog-digital conversion unit 13B in which the analog-digital converter 130 is arranged in units of a plurality of pixel columns can be adopted.

[Chip Structure]

In the CMOS image sensor 1 having the above configuration, a so-called flat-type chip structure (so-called flat structure) is illustrated as the chip (semiconductor integrated circuit) structure, but the chip structure is not limited to the flat-type chip structure. Here, the flat-type chip structure is a structure in which a circuit portion around the pixel array unit 11 is formed on the same semiconductor substrate 10 as the pixel array unit 11 as illustrated in FIG. 1. Specifically, in the flat-type chip structure, on the same semiconductor substrate 10 as the pixel array unit 11, the row selection unit 12, the analog-digital conversion units 13A and 13B, the reference voltage generation units 14A and 14B, the horizontal transfer scanning units 15A and 15B, the signal processing unit 16, the voltage setting unit 17, the timing control unit 18, and the like are formed.

Figure 4:
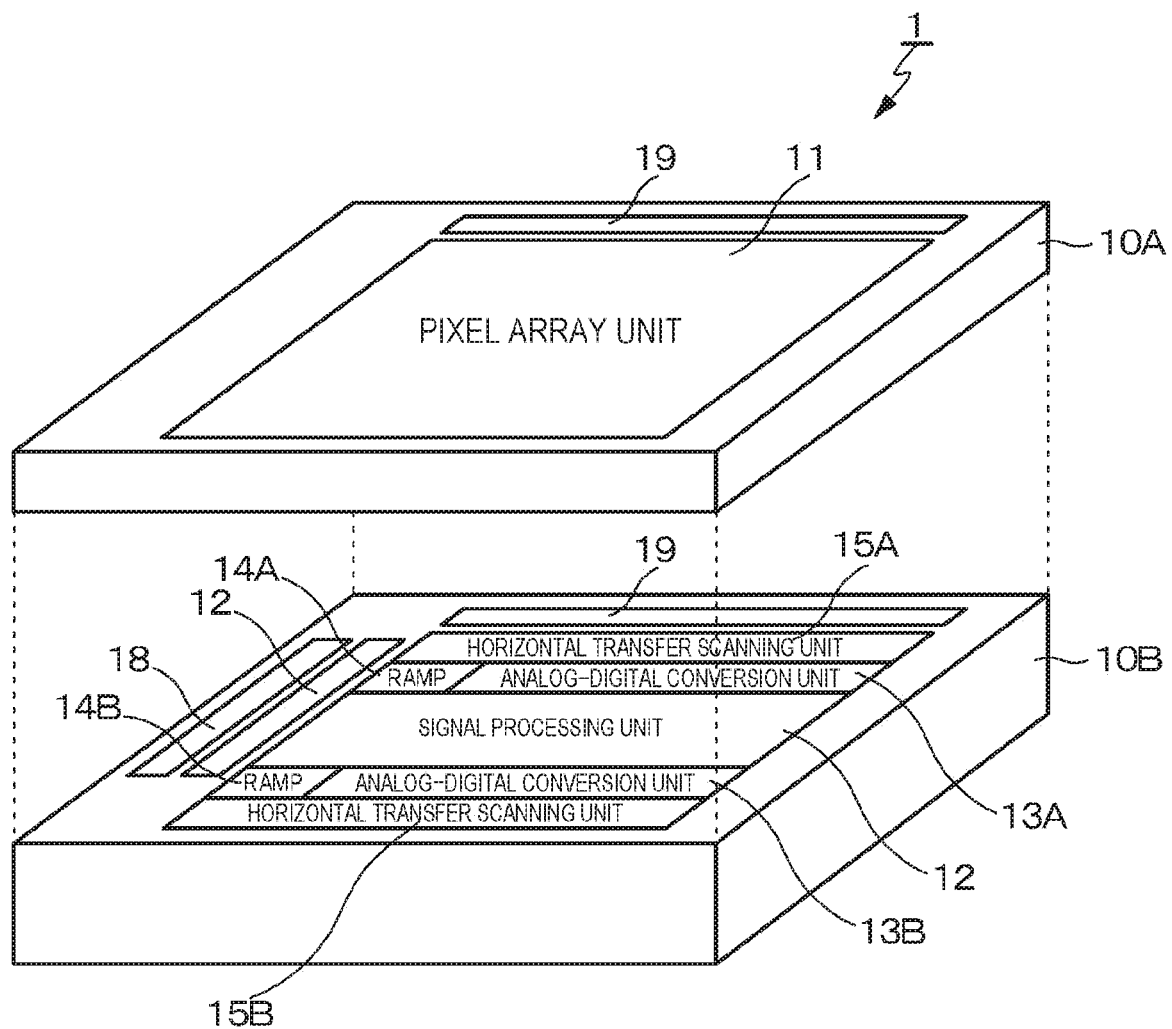
FIG. 4 is an exploded perspective diagram illustrating an outline of a stack-type chip structure.

As the chip (semiconductor integrated circuit) structure, in addition to the flat-type chip structure, a stack-type chip structure can be exemplified. FIG. 4 illustrates an outline of a stack-type chip structure in an exploded perspective diagram. As illustrated in FIG. 4, the stack-type chip structure (so-called stacked structure) has a structure in which at least two semiconductor substrates: a first semiconductor substrate 10A and a second semiconductor substrate 10B are stacked. In this stacked structure, the pixel array unit 11 is formed on the first semiconductor substrate 10A, which is the first layer. Furthermore, a circuit portion including the row selection unit 12, the analog-digital conversion units 13A and 13B, the reference voltage generation units 14A and 14B, the horizontal transfer scanning units 15A and 15B, the signal processing unit 16, the voltage setting unit 17, the timing control unit 18, and the like is formed on the second semiconductor substrate 10B, which is the second layer. Then, the first semiconductor substrate 10A, which is the first layer, and the second semiconductor substrate 10B, which is the second layer, are electrically connected through a connection 19 such as a via or a Cu—Cu connection.

With the CMOS image sensor 1 having the stacked structure, it is sufficient if the first semiconductor substrate 10A has a size (area) for accommodating the pixel array unit 11. Therefore, it is possible to reduce the size (area) of the first semiconductor substrate 10A, which is the first layer, and eventually the size of the entire chip. Moreover, a process suitable for formation of the pixel 2 can be applied to the first semiconductor substrate 10A, which is the first layer, and a process suitable for formation of the circuit portion can be applied to the second semiconductor substrate 10B, which is the second layer. Therefore, there is also a merit that the process can be optimized in manufacture of the CMOS image sensor 1. In particular, when forming the circuit portion, an advanced process can be applied.

Note that, here, as a stacked structure with a two-layer structure formed by stacking the first semiconductor substrate 10A and the second semiconductor substrate 10B has been illustrated, but the stacked structure is not limited to the two-layer structure, but can be a structure with three or more layers. Then, in the case of a stacked structure with three or more layers, the circuit portion including the row selection unit 12, the analog-digital conversion units 13A and 13B, the reference voltage generation units 14A and 14B, the horizontal transfer scanning units 15A and 15B, the signal processing unit 16, the voltage setting unit 17, and the timing control unit 18 can be formed dispersedly on a semiconductor substrate, which is the second or subsequent layer.

[Regarding Poor Image Quality Due to the Two Reference Voltage Generation Units]

By the way, in the CMOS image sensor 1 according to the present embodiment, since the up-and-down reading configuration is adopted for the purpose of improving the frame rate, a plurality of reference voltage generation units, for example, two reference voltage generation units 14A and 14B, are provided corresponding respectively to the analog-digital conversion units 13A and 13B. In a case where there is a plurality of reference voltage generation units, the output setting of the reference voltage RAMP of the ramp wave is the same (same setting) between the two reference voltage generation units 14A and 14B.

However, even when the output setting of the reference voltage RAMP is the same, it is inevitable that a difference in performance due to individual variations in manufacturing occurs between the two reference voltage generation units 14A and 14B, and due to individual variations between the reference voltage generation units 14A and 14B, there is a slight difference in AD conversion performance between the reference voltages RAMP. As a result, a horizontal stripe component is generated in the AD conversion result of the pixel row by each reference voltage RAMP. That is, the slight difference between the plurality of reference voltages RAMP appears as a poor image quality due to the horizontal stripes with respect to the imaging frame or as a step between AD conversion regions, which is one of the causes of deterioration in image quality of a captured image.

It is originally ideal to perform the correction of the error (difference) in the AD conversion performance between the plurality of reference voltages RAMP described above on the reference voltage generation units 14A and 14B themselves. However, in a case where the difference in manufacturing individual variations between the reference voltage generation units 14A and 14B is smaller than the operation setting resolution of the reference voltage generation units 14A and 14B themselves, the difference cannot be corrected. Furthermore, when a configuration in which such a slight difference is possible by the reference voltage generation units 14A and 14B themselves, the analog circuit scale increases and the chip area increases.

[System Configuration of the Imaging Apparatus of the Present Disclosure]

Figure 5:
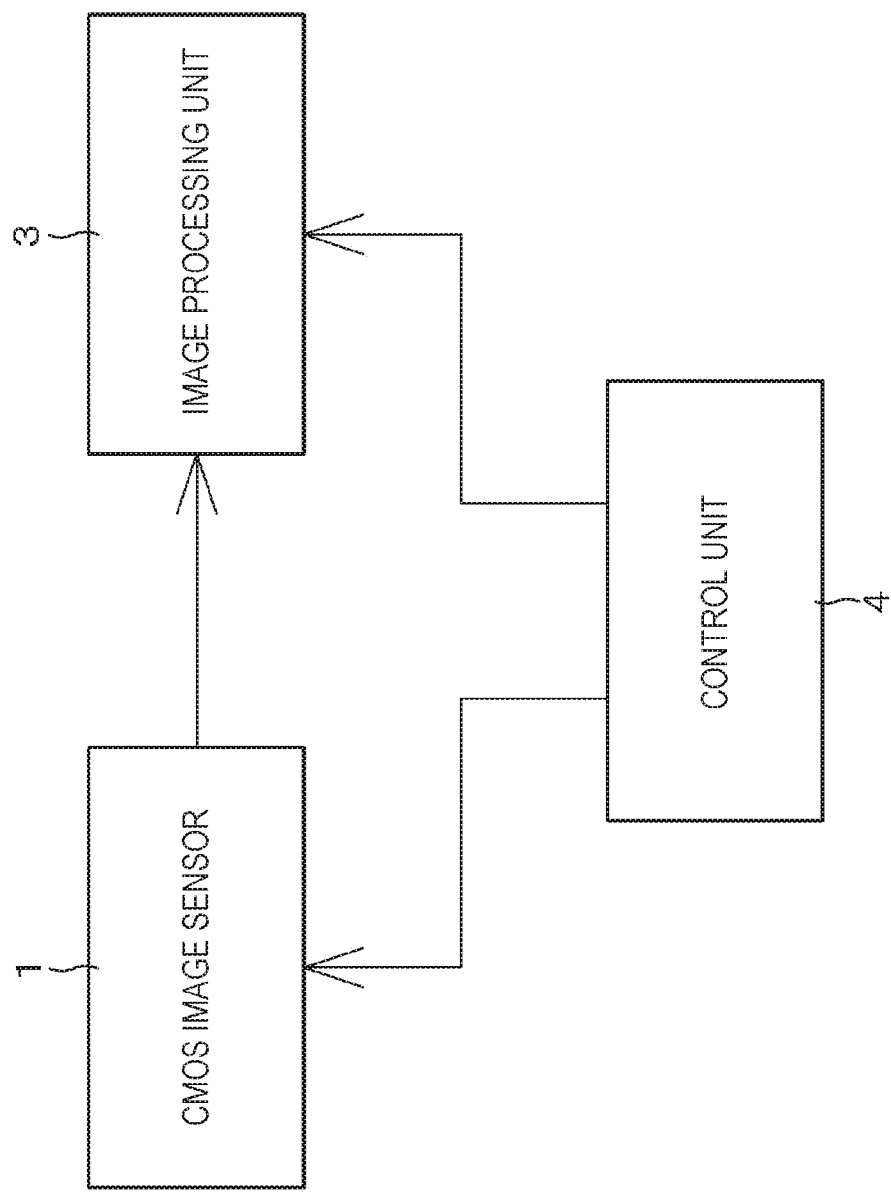
FIG. 5 is a block diagram illustrating an outline of a system configuration of the imaging apparatus of the present disclosure.

An outline of the system configuration of the imaging apparatus of the present disclosure is illustrated in FIG. 5. The imaging apparatus of the present disclosure includes an image processing unit 3 and a control unit 4 provided on a chip other than the CMOS image sensor 1 in addition to the CMOS image sensor 1 having the above configuration. The image processing unit 3 includes an image processing processor and the like, and performs correction processing for an error (difference) in AD conversion performance between the plurality of reference voltages RAMP described above. The details will be described later. The control unit 4 includes, for example, a processor such as a micro processing unit (MPU), and controls the entire system including the correction processing in the image processing unit 3.

DESCRIPTION OF THE EMBODIMENTS

In order to achieve correction of the AD conversion performance error between the plurality of reference voltages RAMP on digital data, the CMOS image sensor 1 includes the voltage setting unit 17 that sets a plurality of pixel voltage levels and outputs each of the plurality of pixel voltage levels through each of the two systems of the analog-digital conversion units 13A and 13B. Note that FIG. 1 illustrates a form in which the plurality of pixel voltage levels set by the voltage setting unit 17 is supplied to all the vertical signal lines $32_1$ to $32_n$, but it is not necessarily limited to supplying all of them. Instead, it may be supplied to some of or one of the vertical signal lines $32_1$ to $32_n$.

Then, the image processing unit 3 performs correction amount calculation processing for performing correction on the digital data and correction processing on the digital data on the basis of the calculated correction amount. Specifically, the image processing unit 3 calculates a correction amount for performing correction on the digital data on the basis of the result of AD conversion (imaging frame) of each of the plurality of pixel voltage levels by each of the analog-digital conversion units 13A and 13. This correction amount is also the error amount of the AD conversion performance error between the plurality of reference voltages RAMP.

That is, the image processing unit 3 has a function as a computing unit that calculates a correction amount for correcting the AD conversion result of the signal of each pixel (effective pixel) 2 of the pixel array unit 11. Moreover, in addition to the computation function for calculating the correction amount, the image processing unit 3 has a correction function of correcting the result of AD conversion of the signal of each pixel 2 of the pixel array unit 11 by the analog-digital conversion units 13A and 13, i.e., the digital data after output of an imaging frame, using the correction amount calculated by the computation function.

As described above, in the present embodiment, for example, in the CMOS image sensor 1 including the two reference voltage generation units 14A and 14B, an error (difference) in AD conversion performance between the plurality of reference voltages RAMP due to the individual variations between the reference voltage generation units 14A and 14B in a case where the reference voltage RAMP has the same setting is calculated as a digital value from the imaging frame after AD conversion. Then, with respect to an imaging frame of subsequent effective pixels, correction is performed on the digital data using a correction amount corresponding to an error amount (digital value) in a direction in which the AD conversion performance error between the plurality of reference voltages RAMP is reduced.

Specific examples for correcting the AD conversion performance error between the plurality of reference voltages RAMP on the digital data after output of an imaging frame for an effective pixel in a case where the output setting of the reference voltage RAMP is the same will be described below.

Example 1

Figure 6:
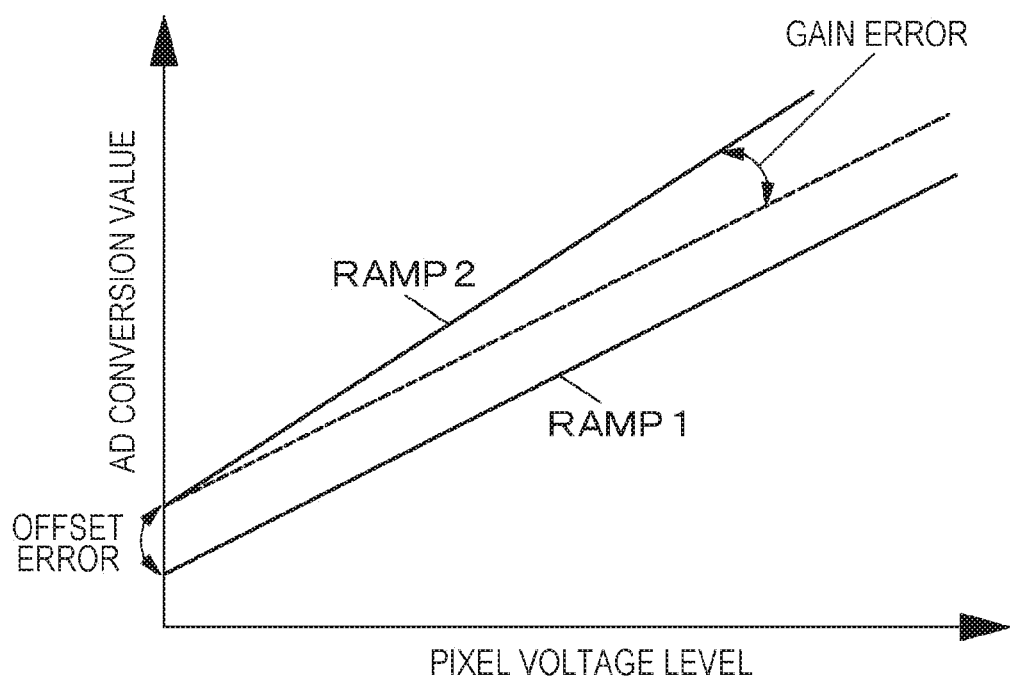
FIG. 6 is a characteristic diagram illustrating a relationship between pixel voltage level and AD conversion value.

Example 1 is an example in which an AD conversion performance error between a plurality of reference voltages RAMP is calculated as a digital value from an imaging frame after AD conversion. In Example 1, it is assumed that the difference in the AD conversion value with respect to the pixel voltage level between the plurality of reference voltages RAMP occurs in both a slope and an intercept of linear characteristics of FIG. 6 illustrating the relationship between the pixel voltage level and the AD conversion value. Hereinafter, for the sake of convenience, the difference in the slope of the linear characteristics will be referred to as a "gain error", and the difference in the intercept will be referred to as an "offset error". Note that, in FIG. 6, the plurality of reference voltages RAMP is two: a reference voltage RAMP1 and a reference voltage RAMP2.

The CMOS image sensor 1 according to the present embodiment includes the voltage setting unit 17 for calculating the gain error and the offset error as digital values. The voltage setting unit 17 sets a plurality of pixel voltage levels, for example, the first pixel voltage level and the second pixel voltage level, and supplies the pixel voltage levels to the two systems of the analog-digital conversion units 13A and 13B through the vertical signal lines $32_1$ to $32_n$. Then, the two systems of the analog-digital conversion units 13A and 13B respectively use the reference voltage RAMP1 and the reference voltage RAMP2 and execute AD conversion on the first pixel voltage level and the second pixel voltage level in units of odd/even pixel rows.

More specifically, under the setting of the pixel voltage level by the voltage setting unit 17, for example, for one imaging frame period, by performing AD conversion on the basis of the reference voltage RAMP1 and the reference voltage RAMP2 in parallel, an imaging frame for correction of the AD conversion performance error between the plurality of reference voltages RAMP (hereinafter, referred to as "correction pixel frame") is output. The correction pixel frame is output under the setting of at least two types of pixel voltage levels, that is, the setting of the first pixel voltage level and the second pixel voltage level.

A correction pixel frame 1 and a correction pixel frame 2 output when the first pixel voltage level and the second pixel voltage level are set include AD conversion pixels based on the reference voltage RAMP1 and the reference voltage RAMP2. However, the pixel voltage level for each correction pixel frame is the same, and after the AD conversion for one imaging frame is completed, the pixel voltage level is changed (first pixel voltage level→second pixel voltage level), AD conversion of a next correction pixel frame is performed.

The image processing unit 3 performs each processing of calculation of a correction amount based on the correction pixel frame 1 and the correction pixel frame 2, and correction based on the correction amount of the digital data after the output of the imaging frame for the effective pixel. The processing in the image processing unit 3 will be specifically described below.

Figure 7:
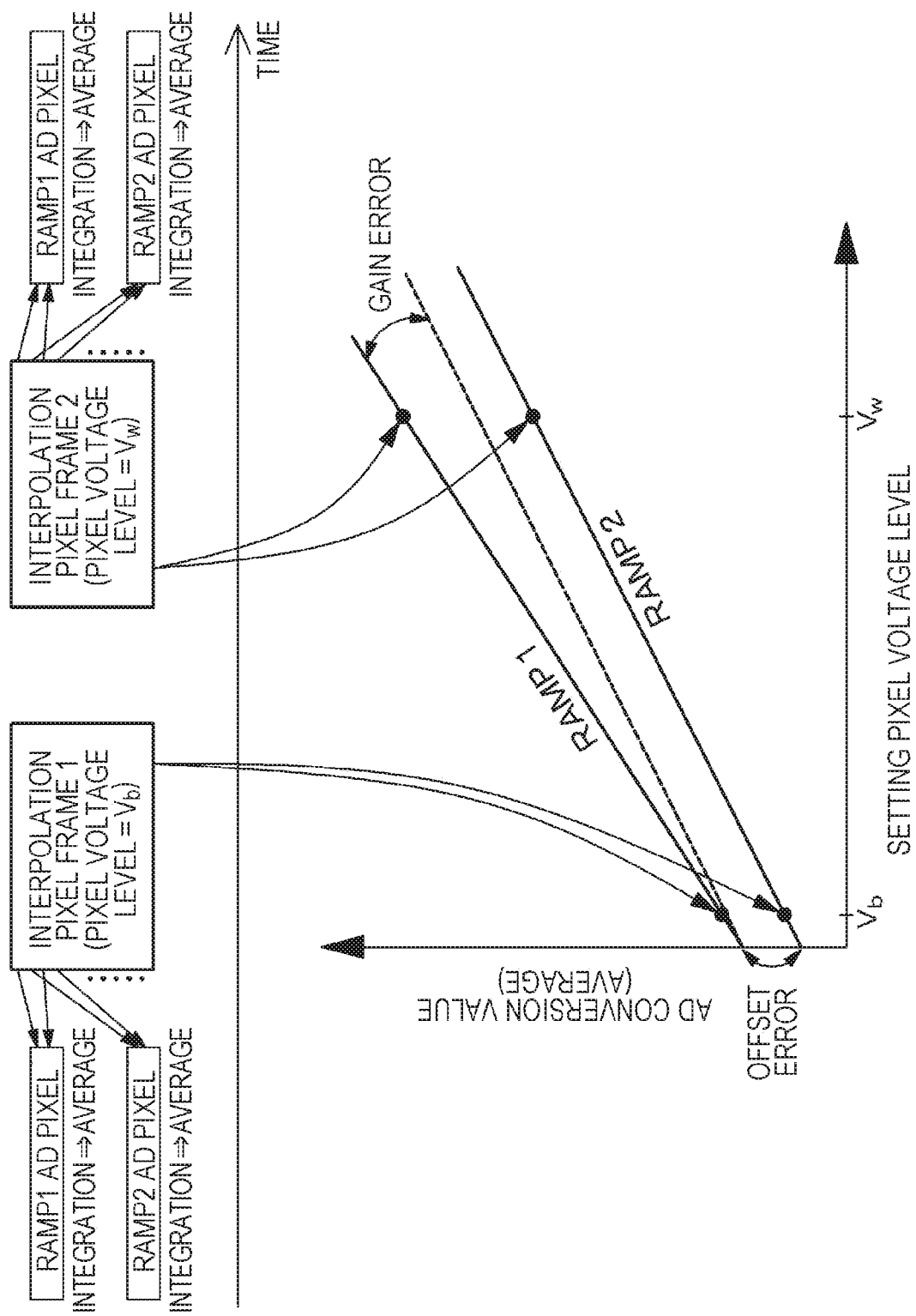
FIG. 7 is an explanatory diagram of calculation of an AD conversion performance error according to Example 1.

The image processing unit 3 integrates AD converted pixel values (AD conversion value) within one imaging frame with respect to the applied reference voltage RAMP1 and reference voltage RAMP2 and acquires an average value of the AD conversion values with respect to each frame in which the first pixel voltage level and the second pixel voltage level are set, that is, with respect to each of the correction pixel frame 1 and the correction pixel frame 2. On the basis of the acquired average value of AD conversion values, as illustrated in FIG. 7, a first-order approximation of the AD conversion performance of the reference voltages RAMP1 and RAMP2 in which the horizontal axis is setting pixel voltage level and the vertical axis is AD conversion value (average value) can be obtained.

Then, each error amount of the gain error and the offset error between the reference voltages RAMP1 and RAMP2 can be calculated from this first order approximation. The gain error amount between the reference voltages RAMP1 and RAMP2 can be unfailingly calculated as the voltage difference between the first pixel voltage level and the second pixel voltage level is larger. From this point of view, it is preferable to set the first pixel voltage level to a black level $V_b$ and the second pixel voltage level to a white level $V_w$. By the setting of the pixel voltage levels, the gain error amount between the reference voltages RAMP1 and RAMP2 can be unfailingly calculated.

For calculating each error amount of the gain error and the offset error between the reference voltages RAMP1 and RAMP2, it is sufficient if integration of the AD conversion values of the reference voltages RAMP1 and RAMP2 is performed sequentially in the pixel output order at the output stage of the correction pixel frame 1 and the correction pixel frame 2. Therefore, the image processing unit 3 can calculate each error amount without using any storage means such as a frame memory.

Next, a method for correcting the AD conversion performance error between the reference voltages RAMP1 and RAMP2, specifically, a method for digitally correcting each error of the gain error and the offset error, which is executed in the image processing unit 3, will be described.

After calculating the gain error and the offset error between the reference voltages RAMP1 and RAMP2 under the setting of the pixel voltage level by the voltage setting unit 17, an imaging frame for the effective pixel in the pixel array unit 11 is output with respect to an AD conversion target pixel. Then, one of the reference voltages RAMP1 and RAMP2 is used as a reference voltage, which is a reference, and the gain error is multiplied (or divided) and the offset error is added (or subtracted) in a direction in which the error is eliminated with respect to all the pixel values (AD conversion values) of an imaging frame of the effective pixel AD-converted by the other reference voltage. By the above processing, the AD conversion performance error between the reference voltages RAMP1 and RAMP2 is corrected on the digital data for the imaging frame of the effective pixel.

Figure 8:
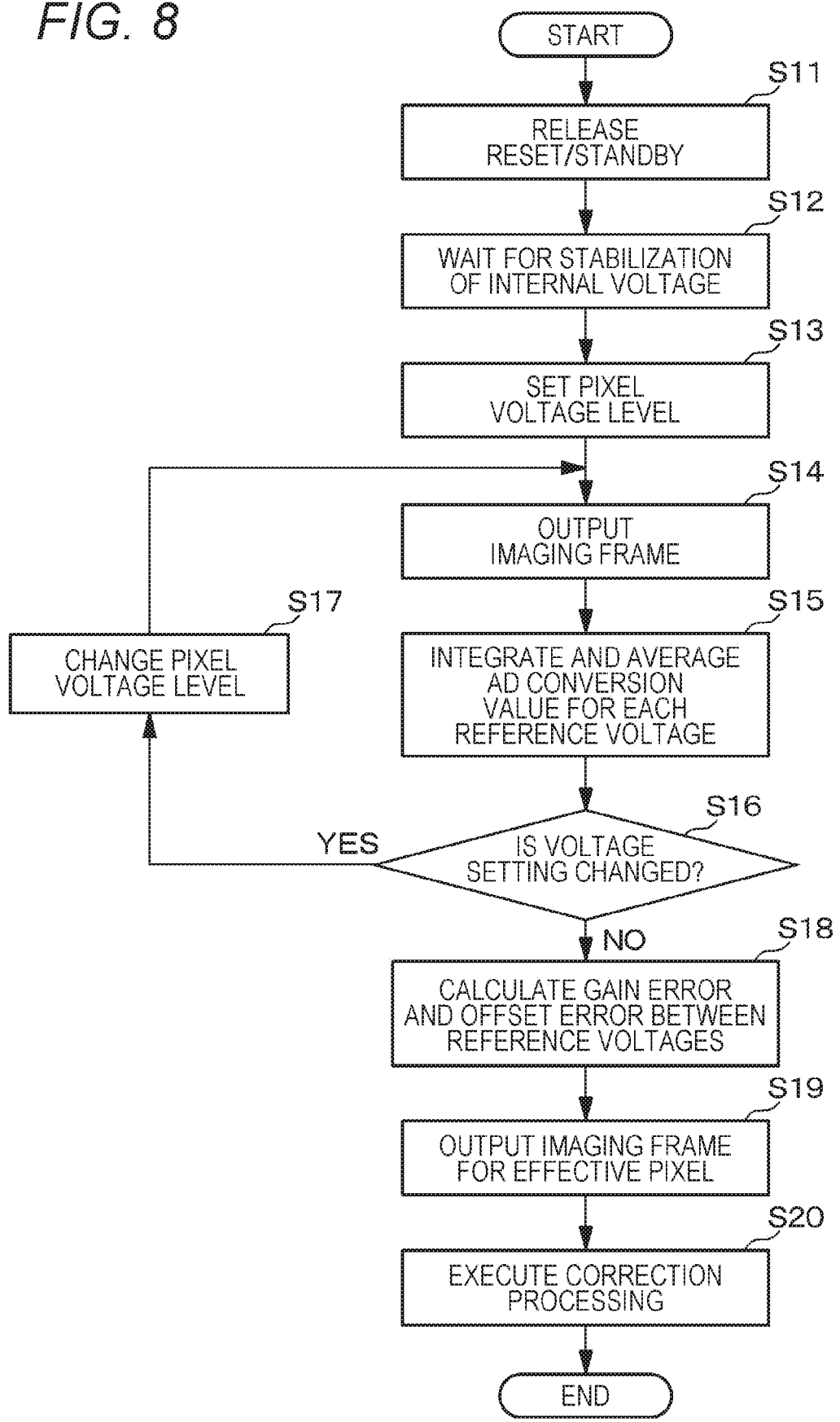
FIG. 8 is a flowchart illustrating an example of a processing procedure for correcting an AD conversion performance error between reference voltages RAMP1 and RAMP2.

Here, an example of a processing procedure for correcting the AD conversion performance error between the reference voltages RAMP1 and RAMP2, which is executed in the system configuration of FIG. 5, will be described with reference to the flowchart of FIG. 8. This series of processing is executed, for example, under the control of a processor constituting the control unit 4.

The processor releases reset/standby of the CMOS image sensor 1 (step S11), then waits for stabilization of an internal voltage (step S12), and then sets a pixel voltage level by the voltage setting unit 17 (step S13). The setting of the pixel voltage level by the voltage setting unit 17 at this time becomes, for example, the setting of the first pixel voltage level (for example, the black level $V_b$).

Next, the processor outputs the correction pixel frame through AD conversion processing based on the reference voltages RAMP1 and RAMP2 in the analog-digital conversion units 13A and 13B under the setting of the pixel voltage level by the voltage setting unit 17 (step S14). In this processing, the correction pixel frame 1 is output under the setting of the first pixel voltage level (black level $V_b$). Next, the processor integrates the AD conversion values for each of the reference voltages RAMP1 and RAMP2 and calculates the average value of the AD conversion values (step S15), and then determines whether or not it is necessary to change the voltage setting in the voltage setting unit 17 (step S16).

When it is necessary to change the voltage setting in the voltage setting unit 17, the voltage setting by the voltage setting unit 17 is changed from the first pixel voltage level to the second pixel voltage level (for example, white level $V_w$) (step S17), and the process returns to step S14. Then, under the setting of the second pixel voltage level (white level $V_w$), the correction pixel frame (that is, the correction pixel frame 2) is output through AD conversion processing (step S14), and then the AD conversion values are integrated for each of the reference voltages RAMP1 and RAMP2 and the average value of the AD conversion values is calculated (step S15).

After the processing under the setting of the second pixel voltage level is completed, the processor calculates each error amount of the gain error and the offset error between the reference voltages RAMP1 and RAMP2 (step S18), then outputs an imaging frame for the effective pixel (step S19), and then performs the correction processing on digital data (step S20). Each processing of step S18 and step S20 is processing of the image processing unit 3.

Figure 9A:
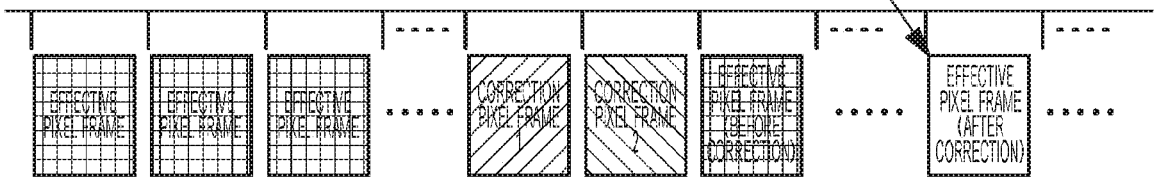
FIGS. 9A and 9B are explanatory diagrams of frame timing at which application of error correction starts.
Figure 9B:
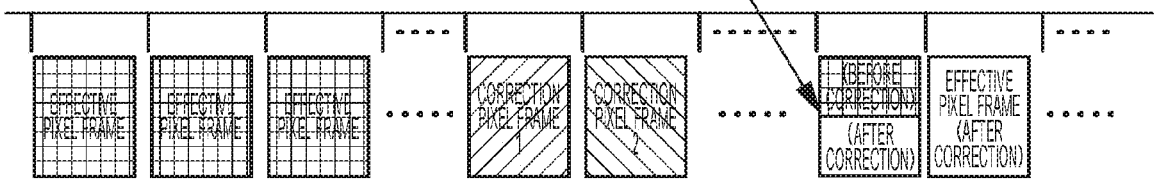

As long as the above procedure is followed, a frame timing at which error correction is applied after the correction pixel frame is output and the gain error and the offset error are calculated may be any timing after output of the correction pixel frame as illustrated in FIG. 9A. Note that the application of the error correction does not necessarily have to start from the beginning of a certain imaging frame, but the application may start from any line during the output of the imaging frame. In this case, with respect to the imaging frame at the time when the application of the error correction is started, the error correction is performed from the middle of the imaging frame, but when the output of the imaging frame is done, the error correction is performed for all lines from the beginning of subsequent imaging frames.

Example 2

Figure 10:
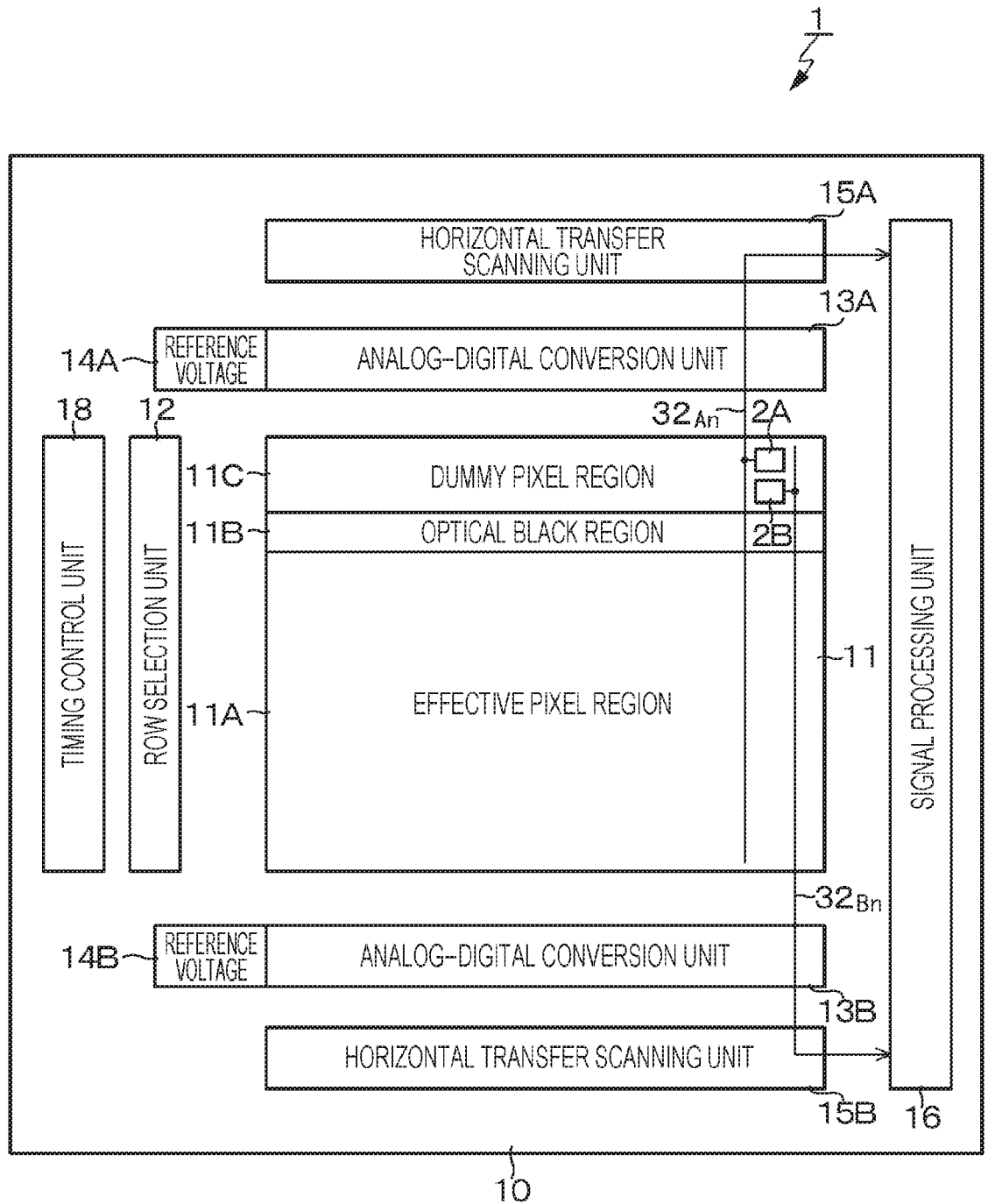
FIG. 10 is a schematic configuration diagram illustrating an outline of a configuration of a CMOS image sensor according to Example 2.

Example 2 is an example in which a dummy pixel is used as the voltage setting unit 17. An outline of a configuration of the CMOS image sensor 1 according to Example 2 is illustrated in FIG. 10.

The dummy pixel is an example of the voltage setting unit 17 that sets the pixel voltage level, and is provided in the region of the pixel array unit 11. The region of the pixel array unit 11 is divided into an effective pixel region 11A, an optical black (OPB) region 11B, and a dummy pixel region 11C. Then, in the effective pixel region 11A, effective pixels (corresponding to the pixel 2 in FIG. 1) used for imaging output are arranged. In the optical black region 11B, light-shielded OPB pixels for obtaining a level, which is a reference for a black level are arranged.

In the dummy pixel region 11C, dummy pixels for setting a plurality of pixel voltage levels, for example, dummy pixels 2A and dummy pixels 2B are arranged. Unlike the original pixel 2 (effective pixel/OPB pixel), the dummy pixel 2A and the dummy pixel 2B do not have a photoelectric conversion unit (photodiode), but similarly to the original pixel 2, the dummy pixel 2A and the dummy pixel 2B are connected to the vertical signal line 32. Specifically, the dummy pixel 2A is connected to a vertical signal line $32_{An}$ transmitting pixel signals of odd rows, and the dummy pixel 2B is connected to a vertical signal line $32_{Bn}$ transmitting pixel signals of even rows.

The dummy pixel 2A and the dummy pixel 2B are provided for at least one pixel column corresponding to each of the plurality of reference voltage generation units 14A and 14B. The present example illustrates a case where the dummy pixel 2A and the dummy pixel 2B are provided for only one pixel column (for example, one pixel column in an n-th row), but may be provided for all pixel columns or may be provided with respect to a plurality of pixel columns. Furthermore, the dummy pixels 2A and the dummy pixels 2B may be provided not only for one pixel row but for a plurality of pixel rows.

Figure 11:
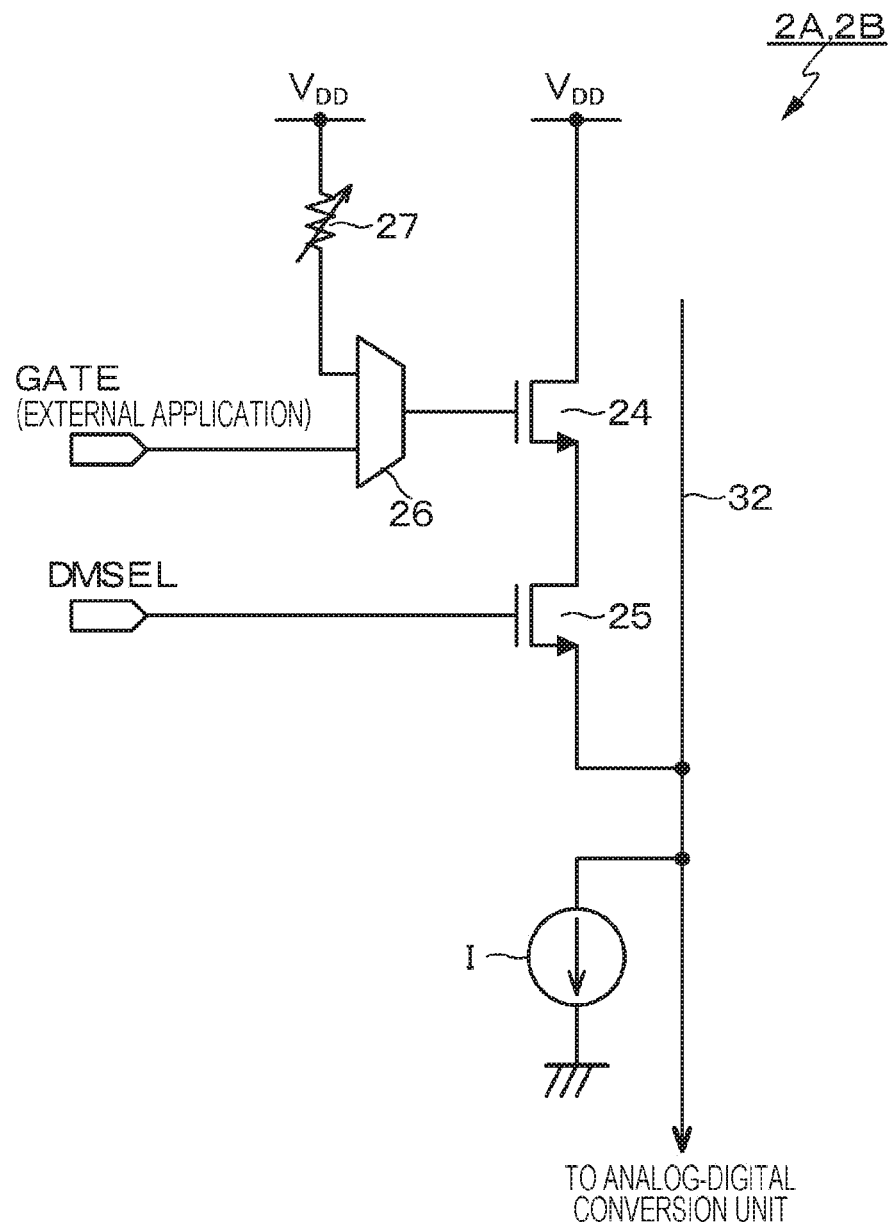
FIG. 11 is a circuit diagram illustrating an example of a circuit configuration of a dummy pixel.

FIG. 11 illustrates an example of a circuit configuration of the dummy pixel 2A and the dummy pixel 2B. The dummy pixel 2A/dummy pixel 2B is connected to the vertical signal line 32 by giving a dummy pixel selection signal DMSEL from the row selection unit 12 to the gate electrode of the selection transistor 25 under the control of the timing control unit 18. The pixel voltage level can be set such that the gate electrode of the amplification transistor 24 is connected to the line of a variable resistor 27 connected to the node of the power supply voltage $V_{DD}$ or the line directly connected to a chip external terminal via a selector 26. The magnitude of the pixel voltage level can be arbitrarily set by adjusting a resistance value of the variable resistor 27.

The processing such as setting of the first pixel voltage level and the second pixel voltage level, calculation of the gain error and the offset error between reference voltages RAMP1 and RAMP2, and correction of the AD conversion performance error between reference voltages RAMP1 and RAMP2 on digital data is similar to the case of Example 1.

The configuration illustrated in FIG. 10 exemplifies a configuration in which the dummy pixel 2A and the dummy pixel 2B are arranged in a part of the pixel array unit 11 in the flat-type chip structure. The dummy pixel 2A and the dummy pixel 2B are circuit units that set arbitrary pixel voltage levels. Therefore, in the flat-type chip structure, the dummy pixel 2A and the dummy pixel 2B do not necessarily have to be arranged in a layer in which the effective pixel (pixel 2) including the photodiode is arranged.

Furthermore, the dummy pixel 2A and the dummy pixel 2B are not limited to the application to the flat-type chip structure, but can also be applied to the stack-type chip structure illustrated in FIG. 4. When applied to the stack-type chip structure, it is preferable that the dummy pixel 2A and the dummy pixel 2B be formed on a layer different from a layer on which the effective pixel is formed, i.e., on a semiconductor substrate other than the semiconductor substrate on which the pixel array unit 11 is formed. Therefore, the dummy pixels 2A and the dummy pixels 2B can be arranged in almost the same number as the effective pixels. As a result, the gain error and the offset error between the reference voltages RAMP1 and RAMP2 can be calculated more accurately under a larger number of dummy pixels.

Example 3

Example 3 is an example in which the gain error and the offset error between the reference voltages RAMP1 and RAMP2 obtained externally are used to perform processing of correcting the AD conversion performance error between the reference voltages RAMP1 and RAMP2 inside the CMOS image sensor 1. This correction processing can be performed by, for example, the signal processing unit 16 in FIG. 1. The CMOS image sensor 1 including the signal processing unit 16 having a function of performing processing for correcting the AD conversion performance error is an example of the imaging apparatus of the present disclosure.

Figure 12:
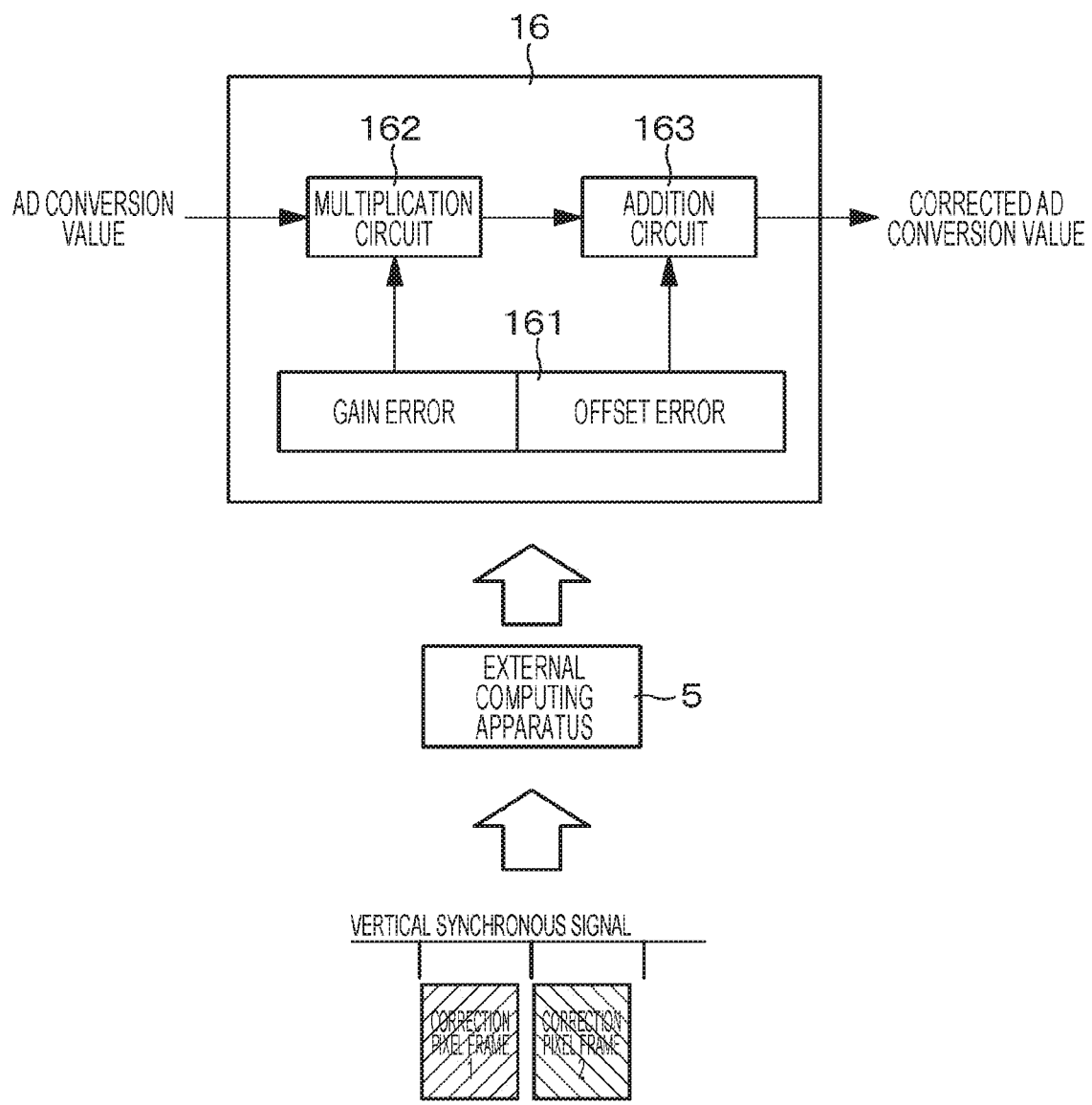
FIG. 12 is a block diagram illustrating an example of a configuration of a signal processing unit according to Example 3.

An example of the configuration of the signal processing unit 16 according to Example 3 is illustrated in FIG. 12. As illustrated in FIG. 12, the signal processing unit 16 according to Example 3 has a digital circuit configuration including a nonvolatile memory 161, a multiplication circuit 162, and an addition circuit 163. The signal processing unit 16 is given, for example, each information of the gain error and the offset error between the reference voltages RAMP1 and RAMP2, which is calculated using the external computing apparatus 5 such as a logic tester. That is, in Example 3, the calculation of the gain error and the offset error between the reference voltages RAMP1 and RAMP2 is performed by the external computing apparatus 5, which is an example of the computing unit.

Each information of the gain error and the offset error between the reference voltages RAMP1 and RAMP2, which is given from the external computing apparatus 5 to the signal processing unit 16, is stored and held in the nonvolatile memory 161. Then, using each information of the gain error and offset error stored and held in the nonvolatile memory 161, correction is performed on the digital data in the multiplication circuit 162 and the addition circuit 163.

Specifically, one of the reference voltages RAMP1 and RAMP2 is used as a reference, and the gain error is multiplied by the multiplication circuit 162 in the direction in which the error is eliminated with respect to all the AD conversion values of the imaging frame of the effective pixel AD-converted by the other, and the addition circuit 163 adds the offset error. By the processing in the signal processing unit 16, the AD conversion performance error between the reference voltages RAMP1 and RAMP2 is corrected on the digital data for the imaging frame of the effective pixel.

Then, each processing including calculation of the gain error and the offset error between the reference voltages RAMP1 and RAMP2, storage of the error information in the nonvolatile memory 161, and correction of the AD conversion performance error between the reference voltages RAMP1 and RAMP2 is performed as a mass production test process of the imaging element. Therefore, the imaging element can be shipped with the error correction between the reference voltages RAMP1 and RAMP2 having been performed without outputting the correction pixel frame during capture of the imaging element and the output of an imaging frame (that is, streaming).

Example 4

Example 4 is an example in which each processing including calculation of the gain error and the offset error between the reference voltages RAMP1 and RAMP2, and correction of the AD conversion performance error between the reference voltages RAMP1 and RAMP2 is performed inside the CMOS image sensor 1. The processing can be performed by the signal processing unit 16 in FIG. 1, for example. The CMOS image sensor 1 including the signal processing unit 16 that has a function of performing each processing including the calculation of the gain error and the offset error and the correction of AD conversion performance error is an example of the imaging apparatus of the present disclosure.

Figure 13:
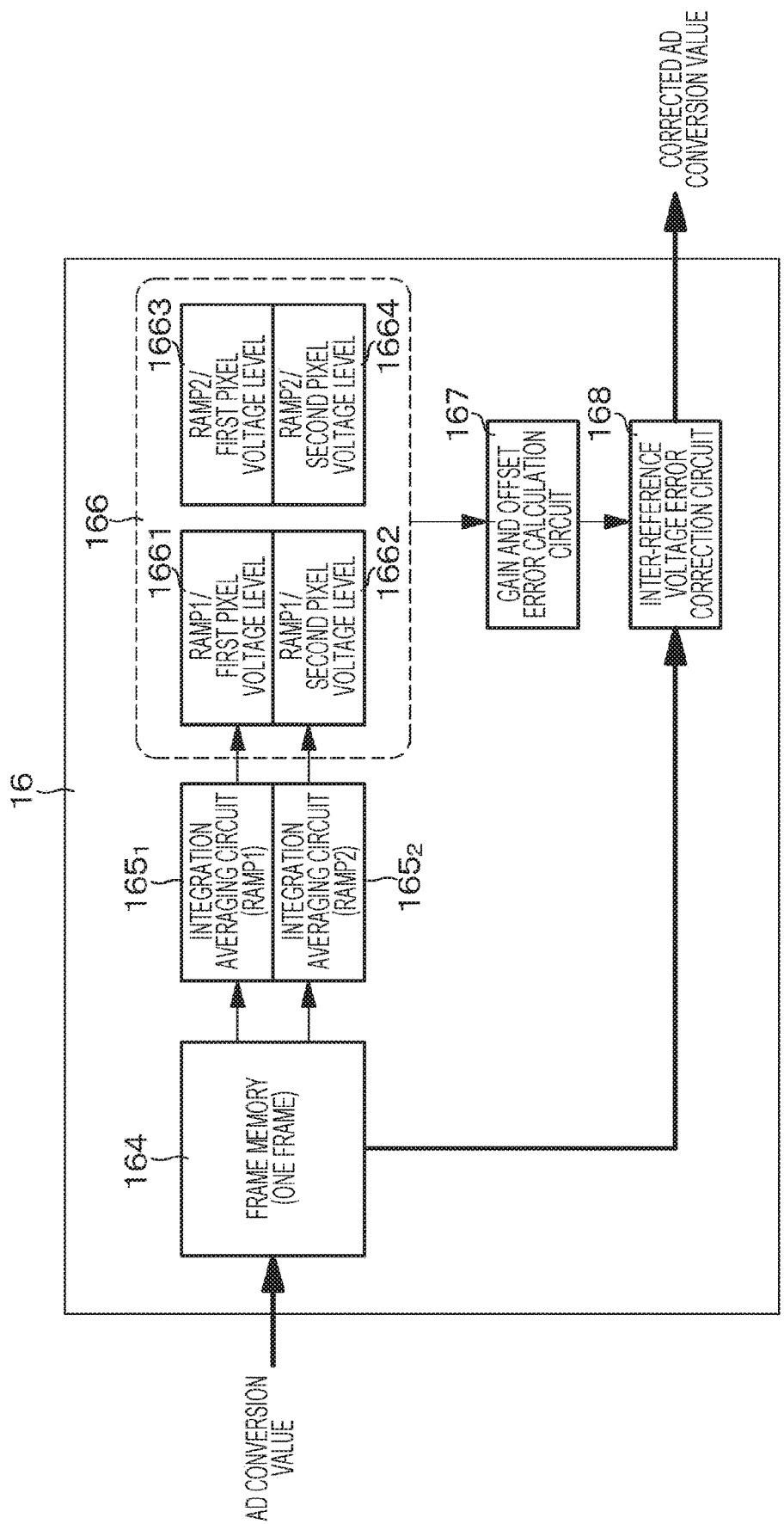
FIG. 13 is a block diagram illustrating an example of a configuration of a signal processing unit according to Example 4.

An example of the configuration of the signal processing unit 16 according to Example 4 is illustrated in FIG. 13. As illustrated in FIG. 13, the signal processing unit 16 according to Example 3 has a digital circuit configuration including a frame memory 164, an integration averaging circuit 1651, an integration averaging circuit 1652, an inter-reference voltage error information storage unit 166, a gain and offset error calculation circuit 167, and inter-reference voltage error correction circuit 168.

In the signal processing unit 16 according to Example 4, the frame memory 164 stores and holds the AD conversion value supplied from the horizontal transfer scanning units 15A and 15B for one imaging frame. The integration averaging circuit 1631 integrates the AD conversion values of a correction imaging frame based on the reference voltage RAMP1 stored and held in the frame memory 164 and calculates an average value of the AD conversion values. The integration averaging circuit 1632 integrates the AD conversion values of a correction imaging frame based on the reference voltage RAMP2 stored and held in the frame memory 164 and calculates an average value of the AD conversion values.

The inter-reference voltage error information storage unit 166 stores the average value of the AD conversion values calculated by the integration averaging circuit 1651 and the integration averaging circuit 1652 as information associated with the gain error and the offset error between the reference voltages RAMP1 and RAMP2. Specifically, the inter-reference voltage error information storage unit 166 stores an average value 1661 of AD conversion values at the time of setting the first pixel voltage level and an average value 1662 of AD conversion values at the time of setting the second pixel voltage level regarding the correction imaging frame based on the reference voltage RAMP1. Moreover, the inter-reference voltage error information storage unit 166 stores an average value 1663 of AD conversion values at the time of setting the first pixel voltage level and an average value 1664 of AD conversion values at the time of setting the second pixel voltage level regarding the correction imaging frame based on the reference voltage RAMP2.

The gain and offset error calculation circuit 167 calculates each error amount of the gain error and the offset error between the reference voltages RAMP1 and RAMP2 on the basis of the inter-reference voltage error information stored and held in the inter-reference voltage error information storage unit 166 as an AD conversion performance error between the reference voltages RAMP1 and RAMP2. The calculation method of Example 1 can be used to calculate each error amount of the gain error and the offset error between the reference voltages RAMP1 and RAMP2.

The inter-reference voltage error correction circuit 168 uses each error amount of the gain error and the offset error between the reference voltages RAMP1 and RAMP2 calculated by the gain and offset error calculation circuit 167 to correct the AD conversion performance error between the reference voltages RAMP1 and RAMP2. Specifically, the inter-reference voltage error correction circuit 168 performs correction on digital data by multiplying (dividing) the gain error and adding (or subtracting) the offset error in a direction in which the errors are eliminated with respect to all the AD conversion values of the imaging frame for the effective pixel stored and held in the frame memory 164.

As described above, in Example 4, the signal processing unit 16 formed on the semiconductor substrate 10 together with the pixel array unit 11 functions as the computing unit that performs each processing including the calculation of the gain error and the offset error, and the correction of the AD conversion performance error. According to Example 4, each processing including the calculation of the AD conversion performance error between the plurality of reference voltages and the correction of the AD conversion performance error is performed inside the CMOS image sensor 1, such that it is possible to prevent the correction pixel frame from being output before and after the correction of the AD conversion performance error during streaming of the imaging frame.

Variation of the Embodiment

In the above embodiments, the case where the technology according to the present disclosure is applied to a CMOS image sensor in which pixels are arranged in a matrix has been described as an example, but the technology according to the present disclosure is not limited to the application to a CMOS image sensor. That is, the technology according to the present disclosure is generally applicable to X-Y address-type imaging apparatuses (imaging elements) in which pixels are two-dimensionally arranged in a matrix.

Furthermore, the technology according to the present disclosure can be applied not only to an imaging element that detects the distribution of the incident light amount of visible light and captures it as an image, but also to general imaging apparatuses that capture the distribution of the incident amount of infrared rays, X-rays, particles, and the like, as an image.

Application Example of the Embodiment

Figure 14:
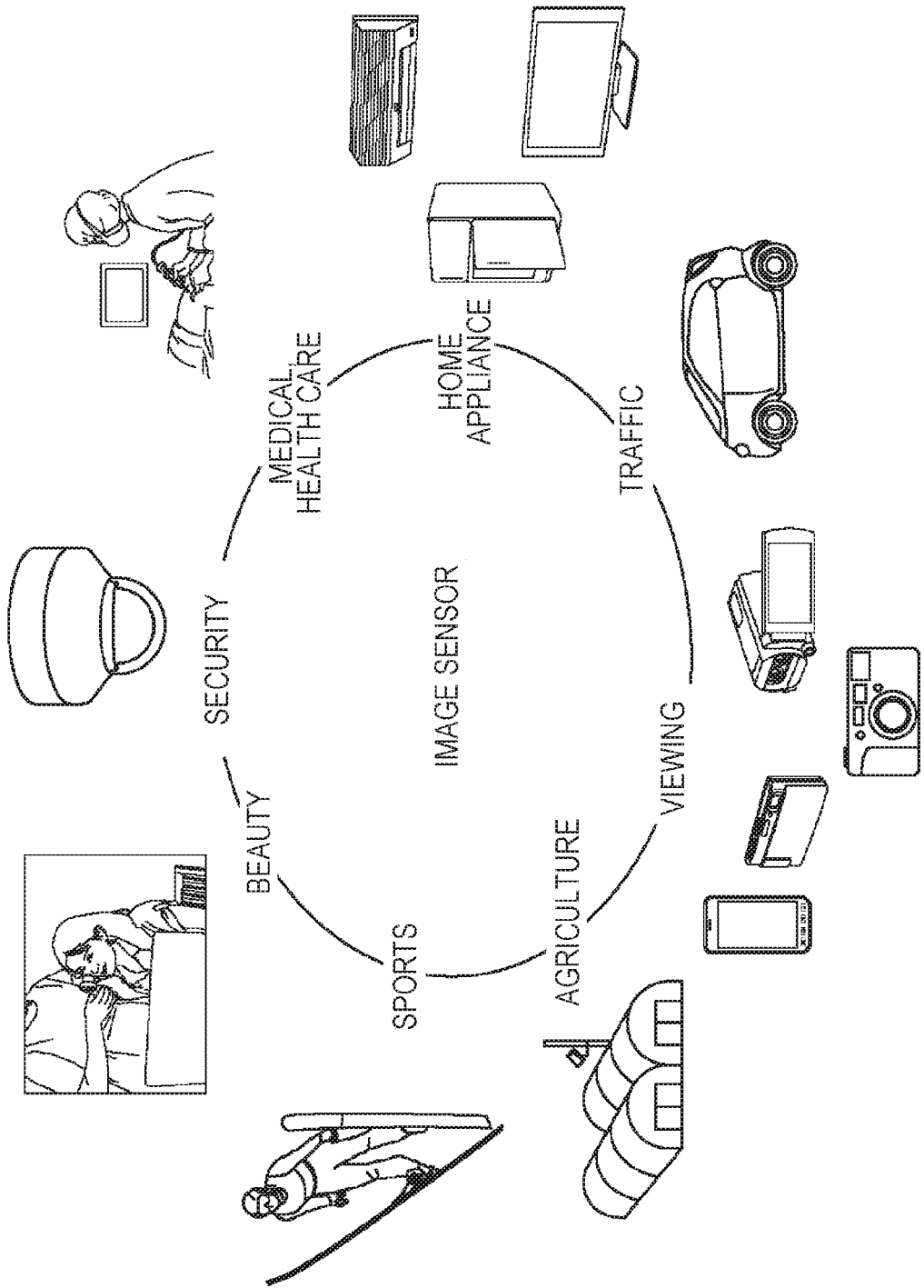
FIG. 14 is a diagram illustrating an application example of the technology according to the present disclosure.

The CMOS image sensor 1 according to the present embodiments described above can be used in various apparatuses for sensing light such as visible light, infrared light, ultraviolet light, and X-rays, as illustrated, for example, in FIG. 14. Specific examples of the various apparatuses are listed below.

- Apparatuses for capturing an image provided for viewing such as a digital camera, portable equipment incorporated with a camera function
- Apparatuses provided for traffic, such as an on-vehicle sensor for capturing a front side, a rear side, a periphery of a vehicle, a car interior, and the like, a monitoring camera for monitoring a traveling vehicle and a road, and a ranging sensor for measuring a distance between vehicles in order to perform safety drive such as automatic stop and recognize driver's conditions, for example
- Apparatuses provided for home electric appliances such as a television, a refrigerator, and an air conditioner in order to capture a user's gesture and operate the equipment in accordance with the gesture
- Apparatuses provided for medical and health care, such as an endoscope and an apparatus for capturing a vessel by receiving infrared light
- Apparatuses provided for security, such as a monitoring camera for crime prevention, and a camera for person authentication
- Apparatuses provided for beauty care, such as skin measurement instrument for capturing skin, and a microscope for capturing a scalp
- Apparatuses provided for sports and the like, such as an action camera and a wearable camera used in sports purposes
- Apparatuses provided for agriculture, such as a camera to monitor the state of farms and products <Electronic Equipment of the Present Disclosure>

The technology according to the present disclosure is applicable to a variety of products. Hereinafter, more specific application examples will be described. Here, description is given of the case of application to an imaging apparatus such as a digital still camera or a video camera, a mobile terminal apparatus having an imaging function such as a mobile phone, or electronic equipment such as a copying machine using an imaging element in an image reading unit.

[Camera Module]

Figure 15:
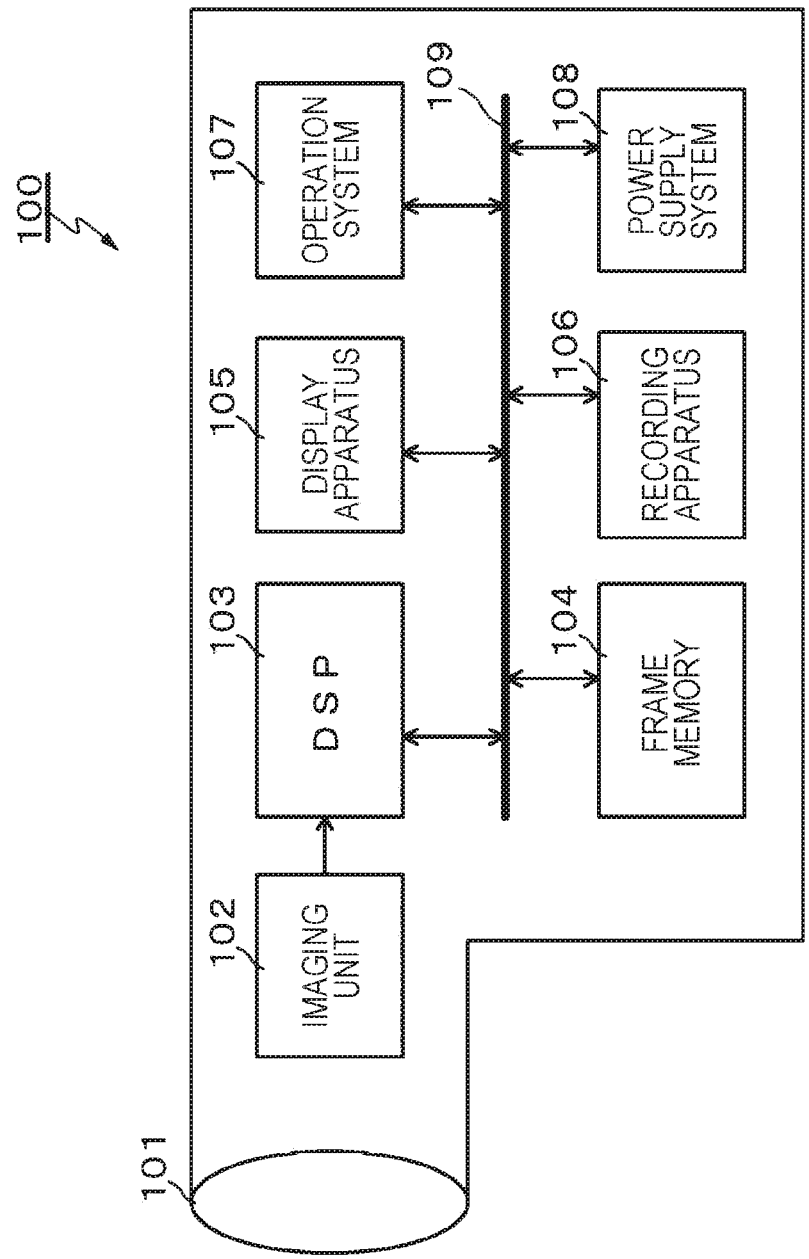
FIG. 15 is a block diagram illustrating a configuration of an imaging apparatus, which is an example of electronic equipment of the present disclosure.

FIG. 15 is a block diagram illustrating a configuration example of a camera module such as a digital still camera or a video camera, which is an example of the electronic equipment of the present disclosure.

As illustrated in FIG. 15, a camera module 100 according to the present example includes an imaging optical system 101 including a lens group or the like, an imaging unit 102, a digital signal processor (DSP) circuit 103, a frame memory 104, a display apparatus 105, a recording apparatus 106, an operation system 107, a power supply system 108, and the like. Then, the DSP circuit 103, the frame memory 104, the display apparatus 105, the recording apparatus 106, the operation system 107, and the power supply system 108 are configured to be mutually connected via a bus line 109.

The imaging optical system 101 takes in incident light (image light) from a subject and forms an image on an imaging surface of the imaging unit 102. The imaging unit 102 converts the amount of incident light that forms an image on the imaging surface by the optical system 101 into an electric signal in units of pixel, and outputs the electric signal as a pixel signal. The DSP circuit 103 performs general camera signal processing, for example, white balance processing, demosaicing processing, gamma correction processing, or the like.

The frame memory 104 is used for storage of data as appropriate in a process of the signal processing in the DSP circuit 103. The display apparatus 105 includes a panel-type display apparatus, e.g., a liquid crystal display apparatus or an organic electro luminescence (EL) display apparatus, and displays a moving image or a still image captured by the imaging unit 102. The recording apparatus 106 records a moving image or a still image captured by the imaging unit 102 on a recording medium, e.g., a portable semiconductor memory, an optical disk, or a hard disk drive (HDD).

The operation system 107 issues operation instructions with respect to various functions of the present imaging apparatus 100 under a user's operation. The power supply system 108 appropriately feeds various power sources, which are operation power for the DSP circuit 103, the frame memory 104, the display apparatus 105, the recording apparatus 106, and the operation system 107, to these feed targets.

The camera module 100 described above can be used as a video camera, a digital still camera, and a camera module for mobile equipment such as smartphones and mobile phones. Then, in the camera module 100, by using the imaging apparatus according to the above-described embodiments as the imaging unit 102, the imaging apparatus can obtain a captured image with high image quality because the image quality of the captured image can be improved by suppressing poor image quality due to an AD conversion performance error between reference voltages due to individual variations among the plurality of reference voltage generation units.

Application Examples to Mobile Objects

The technology according to the present disclosure is applicable to a variety of products. For example, the technology according to the present disclosure may be implemented as imaging elements mounted on any type of movable bodies such as automobiles, electric vehicles, hybrid electric vehicles, motorcycles, bicycles, personal mobilities, airplanes, drones, ships, robots, construction machines, and agricultural machines (tractors).

Figure 16:
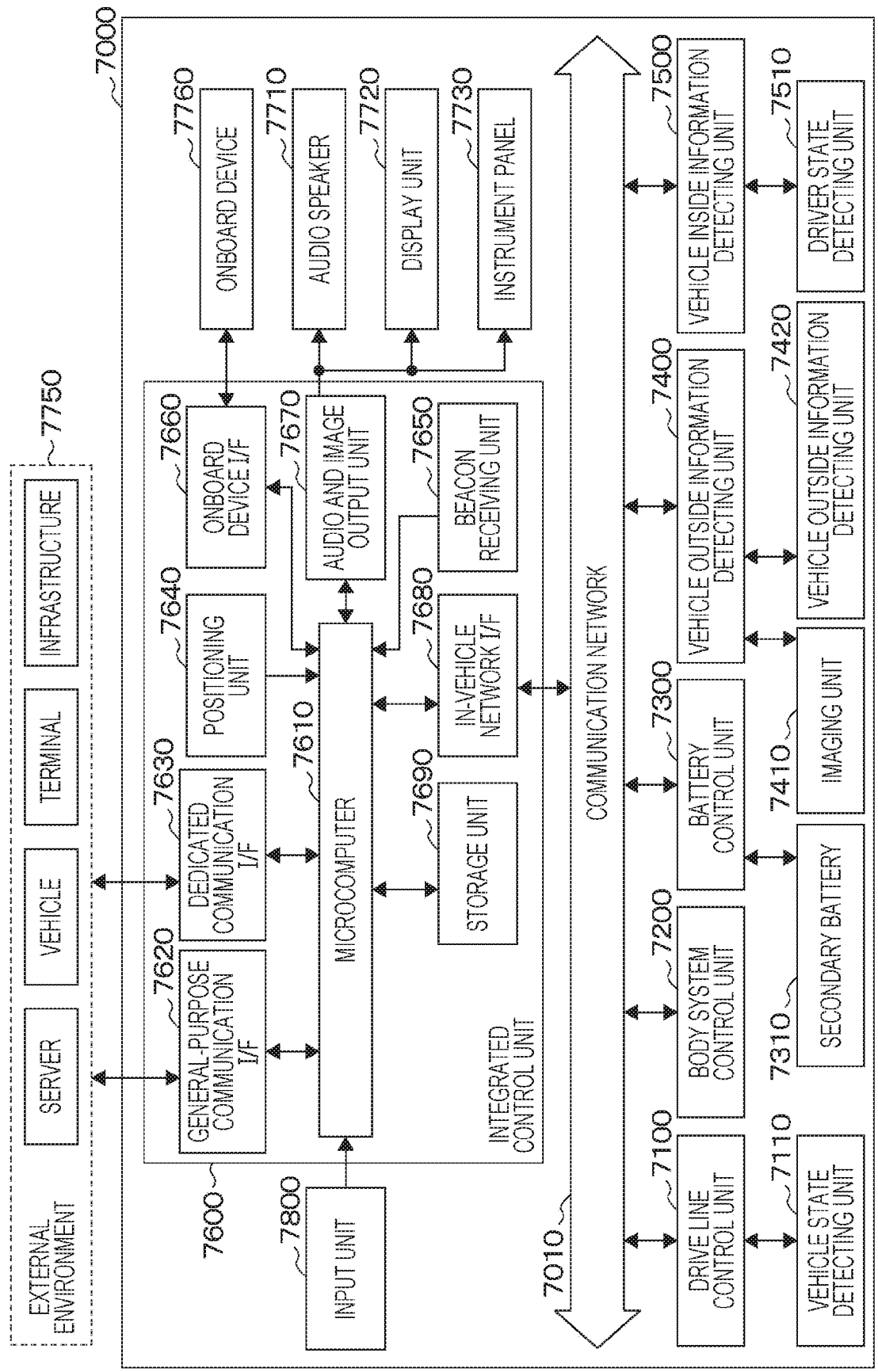
FIG. 16 is a block diagram illustrating a schematic configuration example of a vehicle control system, which is an example of a movable body control system to which the technology according to the present disclosure can be applied.

FIG. 16 is a block diagram illustrating a schematic configuration example of a vehicle control system 7000, which is an example of a movable body control system to which the technology according to the present disclosure can be applied. The vehicle control system 7000 includes a plurality of electronic control units connected via a communication network 7010. In the example illustrated in FIG. 16, the vehicle control system 7000 includes a drive line control unit 7100, a body system control unit 7200, a battery control unit 7300, a vehicle outside information detecting unit 7400, a vehicle inside information detecting unit 7500, and an integrated control unit 7600. The communication network 7010, which connects the plurality of control units, may be an in-vehicle communication network such as a controller area network (CAN), a local interconnect network (LIN), a local area network (LAN), or FlexRay (registered trademark) that is compliant with any standard.

Each control unit includes a microcomputer that performs arithmetic processing in accordance with a variety of programs, a storage unit that stores the programs, parameters used for the variety of operations, or the like executed by the microcomputer, and a driving circuit that drives devices subjected to various types of control. Each control unit includes a network I/F used to communicate with the other control units via the communication network 7010, and a communication I/F used to communicate with devices, sensors, or the like outside and inside the vehicle through wired communication or wireless communication. FIG. 16 illustrates a microcomputer 7610, a general-purpose communication I/F 7620, a dedicated communication I/F 7630, a positioning unit 7640, a beacon receiving unit 7650, an onboard device I/F 7660, an audio and image output unit 7670, an in-vehicle network I/F 7680, and a storage unit 7690 as the functional configuration of the integrated control unit 7600. Each of the other control units similarly includes a microcomputer, a communication I/F, a storage unit, and the like.

The drive line control unit 7100 controls the operation of devices related to the drive line of the vehicle in accordance with a variety of programs. For example, the drive line control unit 7100 functions as a control device for a driving force generating device such as an internal combustion engine or a driving motor that generates the driving force of the vehicle, a driving force transferring mechanism that transfers the driving force to wheels, a steering mechanism that adjusts the steering angle of the vehicle, a braking device that generates the braking force of the vehicle, and the like. The drive line control unit 7100 may have the function of a control device for an antilock brake system (ABS), an electronic stability control (ESC), or the like.

The drive line control unit 7100 is connected to a vehicle state detecting unit 7110. The vehicle state detecting unit 7110 includes, for example, at least one of a gyro sensor that detects the angular velocity of the axial rotating motion of the vehicle body, an acceleration sensor that detects the acceleration of the vehicle, or a sensor that detects the operation amount of the accelerator pedal, the operation amount of the brake pedal, the steering wheel angle of the steering wheel, the engine speed, the wheel rotation speed, or the like. The drive line control unit 7100 uses a signal input from the vehicle state detecting unit 7110 to perform arithmetic processing, and controls the internal combustion engine, the driving motors, the electric power steering device, the braking device, or the like.

The body system control unit 7200 controls the operations of a variety of devices attached to the vehicle body in accordance with a variety of programs. For example, the body system control unit 7200 functions as a control device for a keyless entry system, a smart key system, a power window device, or a variety of lights such as a headlight, a backup light, a brake light, a blinker, or a fog lamp. In this case, the body system control unit 7200 can receive radio waves transmitted from a portable device that serves instead of the key or signals of a variety of switches. The body system control unit 7200 accepts input of these radio waves or signals, and controls the vehicle door lock device, the power window device, the lights, or the like.

The battery control unit 7300 controls a secondary battery 7310, which is a power supply source for a drive motor, in accordance with a variety of programs. For example, the battery control unit 7300 receives information such as the battery temperature, the battery output voltage, or the remaining battery capacity from a battery device including the secondary battery 7310. The battery control unit 7300 uses these signals to perform arithmetic processing, and performs temperature adjusting control on the secondary battery 7310 or controls a cooling device or the like included in the battery device.

The vehicle outside information detecting unit 7400 detects information regarding the outside of the vehicle including the vehicle control system 7000. For example, the vehicle outside information detecting unit 7400 is connected to at least one of an imaging unit 7410 or a vehicle outside information detecting unit 7420. The imaging unit 7410 includes at least one of a time of flight (ToF) camera, a stereo camera, a monocular camera, an infrared camera, or other cameras. The vehicle outside information detecting unit 7420 includes, for example, at least one of an environment sensor that detects the current weather, or a surrounding information detecting sensor that detects another vehicle, an obstacle, a pedestrian, or the like around the vehicle including the vehicle control system 7000.

The environment sensor may be, for example, at least one of a raindrop sensor that detects rainy weather, a fog sensor that detects a fog, a sunshine sensor that detects the degree of sunshine, or a snow sensor that detects a snowfall. The surrounding information detecting sensor may be at least one of an ultrasonic sensor, a radar device, or a light detection and ranging/laser imaging detection and ranging (LIDAR) device. These imaging unit 7410 and vehicle outside information detecting unit 7420 may be installed as independent sensors or devices, or as a device into which a plurality of sensors or devices is integrated.

Figure 17:
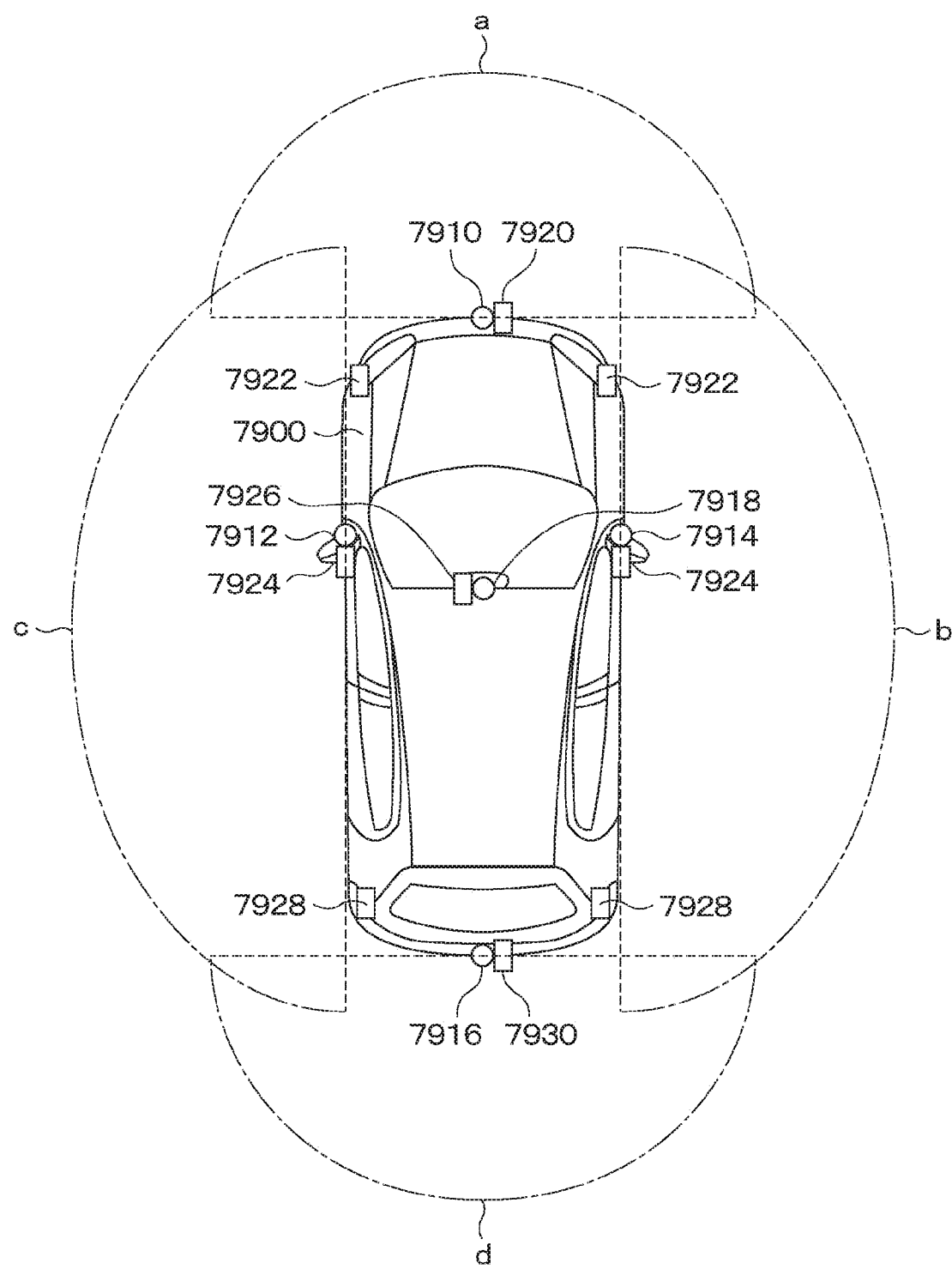
FIG. 17 is a view illustrating an example of an installation position of the imaging unit.

Here, FIG. 17 illustrates an example of installation positions of the imaging unit 7410 and the vehicle outside information detecting unit 7420. Imaging units 7910, 7912, 7914, 7916, and 7918 are positioned, for example, at least one of the front nose, a side mirror, the rear bumper, the back door, or the upper part of the windshield in the vehicle compartment of a vehicle 7900. The imaging unit 7910 attached to the front nose and the imaging unit 7918 attached to the upper part of the windshield in the vehicle compartment chiefly acquire images of the area ahead of the vehicle 7900. The imaging units 7912 and 7914 attached to the side mirrors chiefly acquire images of the areas on the sides of the vehicle 7900. The imaging unit 7916 attached to the rear bumper or the back door chiefly acquires images of the area behind the vehicle 7900. The imaging unit 7918 attached to the upper part of the windshield in the vehicle compartment is used chiefly to detect a preceding vehicle, a pedestrian, an obstacle, a traffic light, a traffic sign, a lane, or the like.

Note that FIG. 17 illustrates an example of the respective imaging ranges of the imaging units 7910, 7912, 7914, and 7916. An imaging range a represents the imaging range of the imaging unit 7910 attached to the front nose. Imaging ranges b and c respectively represent the imaging ranges of the imaging units 7914 and 7912 attached to the side mirrors. An imaging range d represents the imaging range of the imaging unit 7916 attached to the rear bumper or the back door. For example, overlaying image data captured by the imaging units 7910, 7912, 7914, and 7916 offers an overhead image that looks down on the vehicle 7900.

Vehicle outside information detecting units 7920, 7922, 7924, 7926, 7928, and 7930 attached to the front, the rear, the sides, the corners, and the upper part of the windshield in the vehicle compartment of the vehicle 7900 may be, for example, ultrasonic sensors or radar devices. The vehicle outside information detecting units 7920, 7926, and 7930 attached to the front nose, the rear bumper, the back door, and the upper part of the windshield in the vehicle compartment of the vehicle 7900 may be, for example, LIDAR devices. These vehicle outside information detecting units 7920 to 7930 are used chiefly to detect a preceding vehicle, a pedestrian, an obstacle, or the like.

Referring back to FIG. 16, a description is continued. The vehicle outside information detecting unit 7400 causes the imaging unit 7410 to capture images of the outside of the vehicle, and receives the captured image data. Furthermore, the vehicle outside information detecting unit 7400 receives detection information from the connected vehicle outside information detecting unit 7420. In a case where the vehicle outside information detecting unit 7420 is an ultrasonic sensor, a radar device, or a LIDAR device, the vehicle outside information detecting unit 7400 causes ultrasound, radio waves, or the like to be transmitted, and receives the information of the received reflected waves. The vehicle outside information detecting unit 7400 may perform processing of detecting an object such as a person, a car, an obstacle, a traffic sign, or a letter on a road, or processing of detecting the distance on the basis of the received information. The vehicle outside information detecting unit 7400 may perform environment recognition processing of recognizing a rainfall, a fog, a road condition, or the like on the basis of the received information. The vehicle outside information detecting unit 7400 may compute the distance to an object outside the vehicle on the basis of the received information.

Furthermore, the vehicle outside information detecting unit 7400 may perform image recognition processing of recognizing a person, a car, an obstacle, a traffic sign, a letter on a road, or the like, or processing of detecting the distance on the basis of the received image data. The vehicle outside information detecting unit 7400 may perform distortion correcting processing, alignment processing, or the like on the received image data, and combine image data captured by a different imaging unit 7410 to generate an overhead view or a panoramic image. The vehicle outside information detecting unit 7400 may use the image data captured by the other imaging unit 7410 to perform viewpoint converting processing.

The vehicle inside information detecting unit 7500 detects information of the inside of the vehicle. The vehicle inside information detecting unit 7500 is connected, for example, to a driver state detecting unit 7510 that detects the state of the driver. The driver state detecting unit 7510 may include a camera that images the driver, a biological sensor that detects biological information of the driver, a microphone that picks up a sound in the vehicle compartment, or the like. The biological sensor is attached, for example, to a seating face, the steering wheel, or the like, and detects biological information of the passenger sitting on the seat or the driver gripping the steering wheel. The vehicle inside information detecting unit 7500 may compute the degree of the driver's tiredness or the degree of the driver's concentration or determine whether the driver has a doze, on the basis of detection information input from the driver state detecting unit 7510. The vehicle inside information detecting unit 7500 may perform processing such as a noise canceling process on the picked-up audio signal.

The integrated control unit 7600 controls the overall operation inside the vehicle control system 7000 in accordance with a variety of programs. The integrated control unit 7600 is connected to an input unit 7800. The input unit 7800 is implemented as a device such as a touch panel, a button, a microphone, a switch, or a lever on which a passenger can perform an input operation. Data obtained when a voice input by a microphone is voice-recognized may be input to the integrated control unit 7600. The input unit 7800 may be, for example, a remote control device that uses infrared light or other radio waves, or an external connection device such as a mobile telephone or a personal digital assistant (PDA) corresponding to the operation of the vehicle control system 7000. The input unit 7800 may be, for example, a camera. In that case, a passenger can input information through gesture. Alternatively, data obtained when the motion of a wearable device worn on the passenger is detected may be input. Moreover, the input unit 7800 may include an input control circuit or the like that generates an input signal, for example, on the basis of information input by a passenger or the like using the above-described input unit 7800, and outputs the generated input signal to the integrated control unit 7600. The passenger or the like operates this input unit 7800, thereby inputting various types of data to the vehicle control system 7000 or instructing the vehicle control system 7000 about a processing operation.

The storage unit 7690 may include a read only memory (ROM) that stores a variety of programs to be executed by a microcomputer, and a random access memory (RAM) that stores a variety of parameters, arithmetic results, sensor values, or the like. Furthermore, the storage unit 7690 may be implemented as a magnetic storage device such as a hard disk drive (HDD), a semiconductor storage device, an optical storage device, a magneto-optical storage device, or the like.

The general-purpose communication I/F 7620 is a general-purpose communication I/F that mediates in communication between a variety of devices in an external environment 7750. The general-purpose communication I/F 7620 may implement a cellular communication protocol such as global system of mobile communications (GSM) (registered trademark), WiMAX, long term evolution (LTE) or LTE-advanced (LTE-A), or other wireless communication protocols such as a wireless LAN (which is also referred to as Wi-Fi (registered trademark)), or Bluetooth (registered trademark). The general-purpose communication I/F 7620 may be connected to a device (such as an application server or a control server) on an external network (such as the Internet, a cloud network, or a network specific to a service provider), for example, via a base station or an access point. Furthermore, the general-purpose communication I/F 7620 may be connected to a terminal (such as a terminal of a driver, a pedestrian, or a store, or a machine type communication (MTC) terminal) in the vicinity of the vehicle, for example, using the peer-to-peer (P2P) technology.

The dedicated communication I/F 7630 is a communication I/F that supports a communication protocol defined for the purpose of use for vehicles. The dedicated communication I/F 7630 may implement a standard protocol such as wireless access in vehicle environment (WAVE), which is a combination of IEEE 802.11p for the lower layer and IEEE 1609 for the upper layer, dedicated short range communications (DSRC), or a cellular communication protocol. The dedicated communication I/F 7630 typically performs V2X communication. The V2X communication is a concept including one or more of vehicle-to-vehicle communication, vehicle-to-infrastructure communication, vehicle-to-home communication, and vehicle-to-pedestrian communication.

The positioning unit 7640 receives, for example, global navigation satellite system (GNSS) signals (such as global positioning system (GPS) signals from a GPS satellite) from a GNSS satellite for positioning, and generates position information including the latitude, longitude, and altitude of the vehicle. Note that the positioning unit 7640 may also identify the current position by exchanging signals with a wireless access point, or acquire position information from a terminal such as a mobile phone, a PHS, or a smartphone that has a positioning function.

The beacon receiving unit 7650 receives radio waves or electromagnetic waves, for example, from a wireless station or the like installed on the road, and acquires information such as the current position, traffic congestion, closed roads, or necessary time. Note that the function of the beacon receiving unit 7650 may be included in the above-described dedicated communication I/F 7630.

The onboard device I/F 7660 is a communication interface that mediates in connections between the microcomputer 7610 and a variety of devices 7760 in the vehicle. The onboard device I/F 7660 may use a wireless communication protocol such as a wireless LAN, Bluetooth (registered trademark), near field communication (NFC), or a wireless USB (WUSB) to establish a wireless connection. Furthermore, the onboard device I/F 7660 may also establish a wired connection, e.g., a universal serial bus (USB), a high-definition multimedia interface (HDMI (registered trademark)), or mobile high-definition link (MHL) via a connection terminal (and a cable if necessary), which is not illustrated. The onboard devices 7760 may include, for example, at least one of a mobile device of a passenger, a wearable device of a passenger, or an information device carried into or attached to the vehicle. Furthermore, the onboard devices 7760 may include a navigation device that searches a route to any destination. The onboard device I/F 7660 exchanges control signals or data signals with the onboard devices 7760.

The in-vehicle network I/F 7680 is an interface that mediates in communication between the microcomputer 7610 and the communication network 7010. The in-vehicle network I/F 7680 transmits and receives signals or the like in compliance with a predetermined protocol supported by the communication network 7010.

The microcomputer 7610 of the integrated control unit 7600 controls the vehicle control system 7000 in accordance with a variety of programs on the basis of information acquired via at least one of the general-purpose communication I/F 7620, the dedicated communication I/F 7630, the positioning unit 7640, the beacon receiving unit 7650, the onboard device I/F 7660, or the in-vehicle network I/F 7680. For example, the microcomputer 7610 may calculate a control target value of the driving force generating device, the steering mechanism, or the braking device on the basis of acquired information regarding the inside and outside of the vehicle, and output a control instruction to the drive line control unit 7100. For example, the microcomputer 7610 may perform cooperative control for the purpose of executing the functions of the advanced driver assistance system (ADAS) including vehicle collision avoidance or impact reduction, follow-up driving based on the inter-vehicle distance, constant vehicle speed driving, vehicle collision warning, or vehicle lane deviation warning. Furthermore, the microcomputer 7610 may perform cooperative control for the purpose of automatic driving or the like for autonomous running without depending on the driver's operation through control of the driving force generating device, the steering mechanism, the braking device, or the like on the basis of information around the vehicle to be acquired.

The microcomputer 7610 may create local map information including surrounding information regarding the current position of the vehicle by producing three-dimensional distance information between the vehicle and an object including a surrounding structure, person, or the like, on the basis of information acquired via at least one of the general-purpose communication I/F 7620, the dedicated communication I/F 7630, the positioning unit 7640, the beacon receiving unit 7650, the onboard device I/F 7660, or the in-vehicle network I/F 7680. Furthermore, the microcomputer 7610 may predict danger such as vehicle collisions, approaching pedestrians or the like, or entry to closed roads on the basis of acquired information, and generate a warning signal. The warning signal may be, for example, a signal used to generate a warning sound or turn on the warning lamp.

The audio and image output unit 7670 transmits an output signal of at least one of a sound or an image to an output device capable of visually or aurally notifying a passenger of the vehicle or the outside of the vehicle of information. In the example of FIG. 16, an audio speaker 7710, a display unit 7720, and an instrument panel 7730 are exemplified as the output apparatus. For example, the display unit 7720 may include at least one of an onboard display or a head-up display. The display unit 7720 may have an augmented reality (AR) display function. The output device may also be a device other than these devices like a headphone, a wearable device, e.g., a spectacle-type display worn on the passenger, a projector, a lamp, or the like. In a case where the output device is a display device, the display device visually displays a result obtained by the microcomputer 7610 performing a variety of processing or information received from another control unit in a variety of forms such as text, images, tables, or graphs. Furthermore, in a case where the output device is an audio output device, the audio output device converts audio signals including reproduced audio data, acoustic data, or the like into analog signals, and aurally outputs the analog signals.

Note that in the example illustrated in FIG. 16, at least two control units connected via the communication network 7010 may be integrated into a single control unit. Alternatively, the individual control units may include a plurality of control units. Moreover, the vehicle control system 7000 may also include another control unit that is not illustrated. Furthermore, a part or the whole of the functions executed by any of the control units may be executed by another control unit in the above description. That is, as long as information is transmitted and received via the communication network 7010, predetermined arithmetic processing may be performed by any of the control units. Similarly, a sensor or a device connected to any of the control units may be connected to another control unit, and the plurality of control units may transmit and receive detection information to and from each other via the communication network 7010.

An example of the vehicle control system to which the technology according to the present disclosure is applicable is heretofore described. The technology according to the present disclosure can be applied to, for example, the imaging units 7910, 7912, 7914, 7916, and 7918 and the vehicle exterior information detection units 7920, 7922, 7924, 7926, 7928, and 7930 among the configurations described above. Then, by applying the technology according to the present disclosure, it is possible to improve the image quality of a captured image by suppressing a poor image quality due to the AD conversion performance error between the reference voltages due to the individual variations among the plurality of reference voltage generation units. Therefore, for example, it is possible to construct a vehicle control system capable of detecting an imaging target with high accuracy.

<Configuration that can be Adopted by the Present Disclosure>

The present disclosure may adopt the configuration described below.

<<A. Imaging Apparatus>>

[A-1] an Imaging Apparatus Including:

a plurality of analog-digital conversion units that performs parallel processing on a signal of each pixel output in units of a plurality of pixel rows from a pixel array unit in which pixels including photoelectric conversion units are arranged, and converts the signal into a digital signal;

a plurality of reference voltage generation units that is provided corresponding to the plurality of analog-digital conversion units and generates a reference voltage used for analog-digital conversion;

a voltage setting unit that sets a plurality of pixel voltage levels and outputs the plurality of pixel voltage levels through each of the plurality of analog-digital conversion units; and a computing unit that calculates a correction amount for performing correction on a result of the analog-digital conversion of the signal of each pixel of the pixel array unit, in which the computing unit calculates the correction amount on the basis of the result of the analog-digital conversion of each of the plurality of pixel voltage levels by each of the plurality of analog-digital conversion units.

[A-2] The imaging apparatus according to [A-1], in which the computing unit calculates the correction amount for correcting an error in analog-digital conversion performance between the reference voltages in a case where settings of the reference voltages generated by the plurality of reference voltage generation units are same.

[A-3] The imaging apparatus according to [A-1] or [A-2], in which the computing unit calculates the correction amount on the basis of a characteristic difference in analog-digital conversion value with respect to the pixel voltage levels between the plurality of reference voltages.

[A-4] The imaging apparatus according to any of [A-1] to [A-3], in which the plurality of pixel voltage levels includes a first pixel voltage level set to a black level and a second pixel voltage level set to a white level.

[A-5] The imaging apparatus according to [A-4], in which the computing unit calculates the correction amount from a difference in characteristics of the analog-digital conversion values with respect to the pixel voltage levels between characteristics based on an analog-digital conversion value in an imaging frame at a time of setting the first pixel voltage level and characteristics based on an analog-digital conversion value in an imaging frame at a time of setting the second pixel voltage level.

[A-6] The imaging apparatus according to [A-5], in which the computing unit calculates the correction amount from a difference in slope and intercept of the characteristics of the analog-digital conversion value with respect to the pixel voltage level.

[A-7] The imaging apparatus according to [A-6], in which the computing unit integrates an analog-digital conversion value of one imaging frame with respect to each of the first pixel voltage level and the second pixel voltage level, acquires an average value of the analog-digital conversion values, and calculates an error amount of the slope and the intercept of the characteristics of the analog-digital conversion values with respect to the pixel voltage levels on the basis of the acquired average value.

[A-8] The imaging apparatus according to any of [A-1] to [A-7], in which
the voltage setting unit includes a dummy pixel formed in the pixel array unit.

[A-9] The imaging apparatus according to [A-8], in which the dummy pixel is provided for at least one pixel column corresponding to each of the plurality of reference voltage generation units.

[A-10] The imaging apparatus according to [A-9], in which
in a stacked structure in which at least two semiconductor substrates: a first semiconductor substrate and a second semiconductor substrate are stacked,
the pixel array unit is formed on the first semiconductor substrate, and
the dummy pixel is formed on a semiconductor substrate other than the first semiconductor substrate.

[A-11] The imaging apparatus according to any of [A-1] to [A-10], in which
the computing unit uses the calculated correction amount to perform correction on the result of the analog-digital conversion of the signal of each pixel of the pixel array unit.

[A-12] The imaging apparatus according to [A-11], in which
the computing unit includes an image processing unit provided outside a substrate of the pixel array unit, and
the image processing unit uses the calculated correction amount to perform correction on an analog-digital conversion result of an effective pixel of the pixel array unit.

[A-13] The imaging apparatus according to [A-11], in which
the computing unit includes an external computing apparatus provided outside a substrate of the pixel array unit,
the external computing apparatus supplies the calculated correction amount to the signal processing unit provided in the substrate of the pixel array unit, and
the signal processing unit uses the correction amount supplied from the external computing apparatus to perform correction on the analog-digital conversion result of the effective pixel of the pixel array unit.

[A-14] The imaging apparatus according to [A-11], in which
the computing unit includes a signal processing unit provided in a substrate of the pixel array unit, and
the signal processing unit uses the calculated correction amount to perform correction on an analog-digital conversion result of an effective pixel of the pixel array unit.

<<B. Signal Processing Method of Imaging Apparatus>>

[B-1] A signal processing method for an imaging apparatus,
in performing signal processing of the imaging apparatus including:
a plurality of analog-digital conversion units that performs parallel processing on a signal of each pixel output in units of a plurality of pixel rows from a pixel array unit in which pixels including photoelectric conversion units are arranged, and converts the signal into a digital signal; and
a plurality of reference voltage generation units that is provided corresponding to the plurality of analog-digital conversion units and generates a reference voltage used for analog-digital conversion,
the method including:
setting a plurality of pixel voltage levels and outputting the plurality of pixel voltage levels through each of the plurality of analog-digital conversion units; and
calculating a correction amount for performing correction on a result of the analog-digital conversion of the signal of each pixel of the pixel array unit on the basis of the result of the analog-digital conversion of each of the plurality of pixel voltage levels by each of the plurality of analog-digital conversion units.

[B-2] The signal processing method for an imaging apparatus according to [B-1], the method including
calculating the correction amount for correcting an error in analog-digital conversion performance between the reference voltages in a case where settings of the reference voltages generated by the plurality of reference voltage generation units are same.

[B-3] The signal processing method for an imaging apparatus according to [B-1] or [B-2], the method including
calculating the correction amount on the basis of a characteristic difference in analog-digital conversion value with respect to the pixel voltage levels between the plurality of reference voltages.

[B-4] The signal processing method for an imaging apparatus according to any of [B-1] to [B-3], in which the plurality of pixel voltage levels includes a first pixel voltage level set to a black level and a second pixel voltage level set to a white level.

[B-5] The signal processing method for an imaging apparatus according to [B-4], the method including
calculating the correction amount from a difference in characteristics of the analog-digital conversion values with respect to the pixel voltage levels between characteristics based on an analog-digital conversion value in an imaging frame at a time of setting the first pixel voltage level and characteristics based on an analog-digital conversion value in an imaging frame at a time of setting the second pixel voltage level.

[B-6] The signal processing method for an imaging apparatus according to [B-5], the method including
calculating the correction amount from a difference in slope and intercept of the characteristics of the analog-digital conversion value with respect to the pixel voltage level.

[B-7] The signal processing method for an imaging apparatus according to [B-6], the method including
integrating an analog-digital conversion value of one imaging frame with respect to each of the first pixel voltage level and the second pixel voltage level, acquiring an average value of the analog-digital conversion values, and calculating an error amount of the slope and the intercept of the characteristics of the analog-digital conversion values with respect to the pixel voltage levels on the basis of the acquired average value.

[B-8] The signal processing method for an imaging apparatus according to any of [B-1] to [B-7], in which
the voltage setting unit includes a dummy pixel formed in the pixel array unit.

[B-9] The signal processing method for an imaging apparatus according to [B-8], in which
the dummy pixel is provided for at least one pixel column corresponding to each of the plurality of reference voltage generation units.

[B-10] The signal processing method for an imaging apparatus according to [B-9], in which
in a stacked structure in which at least two semiconductor substrates: a first semiconductor substrate and a second semiconductor substrate are stacked,
the pixel array unit is formed on the first semiconductor substrate, and
the dummy pixel is formed on a semiconductor substrate other than the first semiconductor substrate.

[B-11] The signal processing method for an imaging apparatus according to any of [B-1] to [B-10], the method including
using the calculated correction amount to perform correction on the result of the analog-digital conversion of the signal of each pixel of the pixel array unit.

[B-12] The signal processing method for an imaging apparatus according to [B-11], the method including
calculating the correction amount with an image processing unit provided outside a substrate of the pixel array unit, and
using the calculated correction amount to perform correction on an analog-digital conversion result of an effective pixel of the pixel array unit in the image processing unit.

[B-13] The signal processing method for an imaging apparatus according to [B-11], the method including
calculating the correction amount with an external computing apparatus provided outside a substrate of the pixel array unit,
supplying the calculated correction amount to the signal processing unit provided in the substrate of the pixel array unit in the external computing apparatus, and
using the correction amount supplied from the external computing apparatus to perform correction on the analog-digital conversion result of the effective pixel of the pixel array unit in the signal processing unit.

[B-14] The signal processing method for an imaging apparatus according to [B-11], the method including
calculating the correction amount with a signal processing unit provided in a substrate of the pixel array unit, and using the calculated correction amount to perform correction on an analog-digital conversion result of an effective pixel of the pixel array unit.

<<C. Electronic Equipment>>

[C-1] Electronic equipment including an imaging apparatus including:
a plurality of analog-digital conversion units that performs parallel processing on a signal of each pixel output in units of a plurality of pixel rows from a pixel array unit in which pixels including photoelectric conversion units are arranged, and converts the signal into a digital signal;
a plurality of reference voltage generation units that is provided corresponding to the plurality of analog-digital conversion units and generates a reference voltage used for analog-digital conversion;
a voltage setting unit that sets a plurality of pixel voltage levels and outputs the plurality of pixel voltage levels through each of the plurality of analog-digital conversion units; and
a computing unit that calculates a correction amount for performing correction on a result of the analog-digital conversion of the signal of each pixel of the pixel array unit, in which
the computing unit calculates the correction amount on the basis of the result of the analog-digital conversion of each of the plurality of pixel voltage levels by each of the plurality of analog-digital conversion units.

[C-2] The electronic equipment according to [C-1], in which
the computing unit calculates the correction amount for correcting an error in analog-digital conversion performance between the reference voltages in a case where settings of the reference voltages generated by the plurality of reference voltage generation units are same.

[C-3] The electronic equipment according to [C-1] or [C-2], in which
the computing unit calculates the correction amount on the basis of a characteristic difference in analog-digital conversion value with respect to the pixel voltage levels between the plurality of reference voltages.

[C-4] The electronic equipment according to any of [C-1] to [C-3], in which
the plurality of pixel voltage levels includes a first pixel voltage level set to a black level and a second pixel voltage level set to a white level.

[C-5] The electronic equipment according to [C-4], in which
the computing unit calculates the correction amount from a difference in characteristics of the analog-digital conversion values with respect to the pixel voltage levels between characteristics based on an analog-digital conversion value in an imaging frame at a time of setting the first pixel voltage level and characteristics based on an analog-digital conversion value in an imaging frame at a time of setting the second pixel voltage level.

[C-6] The electronic equipment according to [C-5], in which
the computing unit calculates the correction amount from a difference in slope and intercept of the characteristics of the analog-digital conversion value with respect to the pixel voltage level.

[C-7] The electronic equipment according to [C-6], in which the computing unit integrates an analog-digital conversion value of one imaging frame with respect to each of the first pixel voltage level and the second pixel voltage level, acquires an average value of the analog-digital conversion values, and calculates an error amount of the slope and the intercept of the characteristics of the analog-digital conversion values with respect to the pixel voltage levels on the basis of the acquired average value.

[C-8] The electronic equipment according to any of [C-1] to [C-7], in which
the voltage setting unit includes a dummy pixel formed in the pixel array unit.

[C-9] The electronic equipment according to [C-8], in which
the dummy pixel is provided for at least one pixel column corresponding to each of the plurality of reference voltage generation units.

[C-10] The electronic equipment according to [C-9], in which
in a stacked structure in which at least two semiconductor substrates: a first semiconductor substrate and a second semiconductor substrate are stacked,
the pixel array unit is formed on the first semiconductor substrate, and
the dummy pixel is formed on a semiconductor substrate other than the first semiconductor substrate.

[C-11] The electronic equipment according to any of [C-1] to [C-10], in which
the computing unit uses the calculated correction amount to perform correction on the result of the analog-digital conversion of the signal of each pixel of the pixel array unit.

[C-12] The electronic equipment according to [C-11], in which
the computing unit includes an image processing unit provided outside a substrate of the pixel array unit, and
the image processing unit uses the calculated correction amount to perform correction on an analog-digital conversion result of an effective pixel of the pixel array unit.

[C-13] The electronic equipment according to [C-11], in which
the computing unit includes an external computing apparatus provided outside a substrate of the pixel array unit,
the external computing apparatus supplies the calculated correction amount to the signal processing unit provided in the substrate of the pixel array unit, and
the signal processing unit uses the correction amount supplied from the external computing apparatus to perform correction on the analog-digital conversion result of the effective pixel of the pixel array unit.

[C-14] The electronic equipment according to [C-11], in which
the computing unit includes a signal processing unit provided in a substrate of the pixel array unit, and
the signal processing unit uses the calculated correction amount to perform correction on an analog-digital conversion result of an effective pixel of the pixel array unit.

REFERENCE SIGNS LIST

1 CMOS image sensor
2 Pixel
3 Image processing unit
4 Control unit
5 External computing apparatus
11 Pixel array unit
12 Row selection unit
13A, 13B Analog-digital conversion unit
14A, 14B Reference voltage generation unit
15A, 15B Horizontal transfer scanning unit
16 Signal processing unit
17 Voltage setting unit
18 Timing control unit
21 Photodiode
22 Transfer transistor
23 Reset transistor
24 Amplification transistor
25 Selection transistor
$31_1$ to $31_m$ Pixel drive line
$32_{A1}$ to $32_{An}$, $32_{B1}$ to $32_{Bn}$ Vertical signal line

The invention claimed is:

1. An imaging apparatus, comprising:
a plurality of analog-digital conversion units that performs parallel processing on a signal of each pixel output in units of a plurality of pixel rows from a pixel array unit in which pixels including photoelectric conversion units are arranged, and converts the signal into a digital signal;
a plurality of reference voltage generation units that is provided corresponding to the plurality of analog-digital conversion units and generates a reference voltage used for analog-digital conversion;
a voltage setting unit that sets a plurality of pixel voltage levels and outputs the plurality of pixel voltage levels through each of the plurality of analog-digital conversion units; and
a computing unit that calculates a correction amount for performing correction on a result of the analog-digital conversion of the signal of each pixel of the pixel array unit, wherein
the computing unit calculates the correction amount on a basis of the result of the analog-digital conversion of each of the plurality of pixel voltage levels by each of the plurality of analog-digital conversion units.

2. The imaging apparatus according to claim 1, wherein the computing unit calculates the correction amount for correcting an error in analog-digital conversion performance between reference voltages in a case where settings of the reference voltages generated by the plurality of reference voltage generation units are same.

3. The imaging apparatus according to claim 1, wherein the computing unit calculates the correction amount on a basis of a characteristic difference in analog-digital conversion value with respect to the pixel voltage levels between reference voltages.

4. The imaging apparatus according to claim 1, wherein the plurality of pixel voltage levels includes a first pixel voltage level set to a black level and a second pixel voltage level set to a white level.

5. The imaging apparatus according to claim 4, wherein the computing unit calculates the correction amount from a difference in characteristics of analog-digital conversion values with respect to the pixel voltage levels between characteristics based on an analog-digital conversion value in an imaging frame at a time of setting the first pixel voltage level and characteristics based on an analog-digital conversion value in an imaging frame at a time of setting the second pixel voltage level.

6. The imaging apparatus according to claim 5, wherein the computing unit calculates the correction amount from a difference in slope and intercept of the characteristics of the analog-digital conversion value with respect to the pixel voltage level.

7. The imaging apparatus according to claim 6, wherein the computing unit integrates an analog-digital conversion value of one imaging frame with respect to each of the first pixel voltage level and the second pixel voltage level, acquires an average value of the analog-digital conversion values, and calculates an error amount of the slope and the intercept of the characteristics of the analog-digital conversion values with respect to the pixel voltage levels on a basis of the acquired average value.

8. The imaging apparatus according to claim 1, wherein the voltage setting unit includes a dummy pixel formed in the pixel array unit.

9. The imaging apparatus according to claim 8, wherein the dummy pixel is provided for at least one pixel column corresponding to each of the plurality of reference voltage generation units.

10. The imaging apparatus according to claim 9, wherein
in a stacked structure in which a first semiconductor substrate and a second semiconductor substrate are stacked,
the pixel array unit is formed on the first semiconductor substrate, and
the dummy pixel is formed on a semiconductor substrate other than the first semiconductor substrate.

11. The imaging apparatus according to claim 1, wherein
the computing unit uses the calculated correction amount to perform correction on the result of the analog-digital conversion of the signal of each pixel of the pixel array unit.

12. The imaging apparatus according to claim 11, wherein
the computing unit includes an image processing unit provided outside a substrate of the pixel array unit, and
the image processing unit uses the calculated correction amount to perform correction on an analog-digital conversion result of an effective pixel of the pixel array unit.

13. The imaging apparatus according to claim 11, wherein
the computing unit includes an external computing apparatus provided outside a substrate of the pixel array unit,
the external computing apparatus supplies the calculated correction amount to a signal processing unit provided in the substrate of the pixel array unit, and
the signal processing unit uses the correction amount supplied from the external computing apparatus to perform correction on the analog-digital conversion result of an effective pixel of the pixel array unit.

14. The imaging apparatus according to claim 11, wherein
the computing unit includes a signal processing unit provided in a substrate of the pixel array unit, and
the signal processing unit uses the calculated correction amount to perform correction on an analog-digital conversion result of an effective pixel of the pixel array unit.

15. A signal processing method for an imaging apparatus,
in performing signal processing of the imaging apparatus including:
a plurality of analog-digital conversion units that performs parallel processing on a signal of each pixel output in units of a plurality of pixel rows from a pixel array unit in which pixels including photoelectric conversion units are arranged, and converts the signal into a digital signal; and
a plurality of reference voltage generation units that is provided corresponding to the plurality of analog-digital conversion units and generates a reference voltage used for analog-digital conversion,
the method comprising:
setting a plurality of pixel voltage levels and outputting the plurality of pixel voltage levels through each of the plurality of analog-digital conversion units; and
calculating a correction amount for performing correction on a result of the analog-digital conversion of the signal of each pixel of the pixel array unit on a basis of the result of the analog-digital conversion of each of the plurality of pixel voltage levels by each of the plurality of analog-digital conversion units.

16. An electronic equipment, comprising:
an imaging apparatus including:
a plurality of analog-digital conversion units that performs parallel processing on a signal of each pixel output in units of a plurality of pixel rows from a pixel array unit in which pixels including photoelectric conversion units are arranged, and converts the signal into a digital signal;
a plurality of reference voltage generation units that is provided corresponding to the plurality of analog-digital conversion units and generates a reference voltage used for analog-digital conversion;
a voltage setting unit that sets a plurality of pixel voltage levels and outputs the plurality of pixel voltage levels through each of the plurality of analog-digital conversion units; and
a computing unit that calculates a correction amount for performing correction on a result of the analog-digital conversion of the signal of each pixel of the pixel array unit, wherein
the computing unit calculates the correction amount on a basis of the result of the analog-digital conversion of each of the plurality of pixel voltage levels by each of the plurality of analog-digital conversion units.

* * * * *